US012206166B2

(12) United States Patent
Winkler et al.

(10) Patent No.: US 12,206,166 B2
(45) Date of Patent: Jan. 21, 2025

(54) ANTENNA ARRANGEMENT, TRANSCEIVER ARRANGEMENT, COMMUNICATION SYSTEM, ACTUATOR DEVICE, AND METHOD FOR OPERATING AN ANTENNA ARRANGEMENT

(71) Applicant: Rosenberger Hochfrequenztechnik Gmbh & Co. KG, Fridolfing (DE)

(72) Inventors: Johannes Winkler, Tengling (DE); Max Stephan Reuther, Burghausen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 18/569,388

(22) PCT Filed: May 24, 2022

(86) PCT No.: PCT/EP2022/063995

§ 371 (c)(1),
(2) Date: Dec. 12, 2023

(87) PCT Pub. No.: WO2022/263119

PCT Pub. Date: Dec. 22, 2022

(65) Prior Publication Data

US 2024/0283145 A1 Aug. 22, 2024

(30) Foreign Application Priority Data

Jun. 17, 2021 (EP) .................................... 21180140

(51) Int. Cl.
*H01Q 1/52* (2006.01)
*H01Q 17/00* (2006.01)

(52) U.S. Cl.
CPC ............ *H01Q 1/525* (2013.01); *H01Q 17/00* (2013.01)

(58) Field of Classification Search
CPC ........ H01Q 1/525; H01Q 3/28; H01Q 9/0428; H01Q 17/00; H01Q 21/065; H01Q 21/24; H01P 5/222; H01P 5/225; H01P 5/227
See application file for complete search history.

(56) References Cited

U.S. PATENT DOCUMENTS 4,460,899 A 7/1984 Schmidt
5,801,660 A 9/1998 Ohtsuka
(Continued)

FOREIGN PATENT DOCUMENTS

CN 111192589 A 5/2020
GB 2331185 A 6/1999
(Continued)

OTHER PUBLICATIONS

European Search Report dated Nov. 29, 2021.
International Search Report dated Sep. 9, 2022.
European Office Action dated Mar. 14, 2023.
A. Kee, M. Elmansouri, D. S. Filipovic, Circularly Polarized PIFA Array For Simultaneous Transmit And Receive Applications, 2017 IEEE International Symposium on Antennas and Propagation, pp. 2303-2304.
(Continued)

*Primary Examiner* — Dameon E Levi
*Assistant Examiner* — Leah Rosenberg
(74) *Attorney, Agent, or Firm* — Randall Danskin P.S.

(57) ABSTRACT

An antenna arrangement (1) for use within a full-duplex communication channel, comprising at least a first planar receiving antenna (4) and a transmitting antenna group with a first planar transmitting antenna (2) and a second planar transmitting antenna (3). The transmitting antennas (2, 3) and the first receiving antenna (4) are arranged with their respective main surfaces (6) parallel to a common base surface (7) around a common center of rotation (Z), wherein the transmitting antennas (2, 3) are arranged rotated 180° to one another around the center of rotation (Z). The first receiving antenna (4) has the same center-to-center distance (D) to both transmitting antennas (2, 3).

17 Claims, 6 Drawing Sheets

(56) References Cited

U.S. PATENT DOCUMENTS

| | | | | |
|---|---|---|---|---|
| 5,880,695 | A | 3/1999 | Brown | |
| 6,608,604 | B1 * | 8/2003 | Sharaiha | H01Q 11/08<br>343/702 |
| 8,233,450 | B2 | 7/2012 | Zaki | |
| 2007/0241962 | A1 | 10/2007 | Shinoda | |
| 2011/0018784 | A1 | 1/2011 | Hilsebecher | |
| 2012/0299789 | A1 | 11/2012 | Orban | |
| 2013/0163483 | A1 | 6/2013 | Sarraf | |
| 2015/0070217 | A1 * | 3/2015 | Sharawi | H01Q 21/065<br>342/445 |
| 2016/0211963 | A1 * | 7/2016 | Liu | H01Q 1/525 |
| 2016/0240912 | A1 | 8/2016 | Zhang | |
| 2016/0329635 | A1 | 11/2016 | Tsutsumi | |
| 2017/0179603 | A1 | 6/2017 | Charvat | |
| 2018/0159247 | A1 | 6/2018 | Rashidian | |
| 2020/0059011 | A1 * | 2/2020 | Sarabandi | H01Q 21/065 |
| 2020/0106158 | A1 | 4/2020 | Gomez | |
| 2020/0366001 | A1 * | 11/2020 | Popugaev | H01P 5/227 |
| 2021/0296771 | A1 * | 9/2021 | Sano | H04B 3/52 |

FOREIGN PATENT DOCUMENTS

| | | | |
|---|---|---|---|
| JP | 2015037240 | A | 2/2015 |
| JP | 2020022141 | A | 2/2020 |
| JP | 2020178165 | A | 10/2020 |
| JP | 2021189615 | A | 12/2021 |
| WO | 2015075072 | A1 | 5/2015 |

OTHER PUBLICATIONS

English Language OEE Work Product for EP 22732902A.

European Search Report dated Mar. 4, 2024.

Office Action issued by the Japanese Patent Office dated Jul. 9, 2024.

Office Action issued by the State Intellectual Property Office of China dated Jul. 31, 2024.

European Search Report dated Aug. 8, 2024.

* cited by examiner

ANTENNA ARRANGEMENT, TRANSCEIVER ARRANGEMENT, COMMUNICATION SYSTEM, ACTUATOR DEVICE, AND METHOD FOR OPERATING AN ANTENNA ARRANGEMENT

CROSS-REFERENCE TO RELATED APPLICATIONS

This US National Stage Non-Provisional patent application claims priority to earlier filed PCT Patent Application No. PCT/EP2022/063995 which was filed on 24 May 2022, and which issued as EP 4,150,708 on Dec. 27, 2023, and also claims priority to still earlier filed European Patent Application No. 21 180 140.2, which was filed on 17 Jun. 2021. The entire contents of the aforementioned earlier filed PCT Patent Application, the granted European Patent, and the earlier filed European Patent Application are all expressly and fully incorporated herein by this reference.

Pursuant to USPTO rules, this priority claim to earlier filed PCT Patent Application No. PCT/EP2022/063995 which was filed on 24 May 2022, to granted European Patent EP 4,150,708, and also to still earlier filed European Patent Application No. 21 180 140.2 which was filed on 17 Jun. 2021 is also included in the Application Data Sheet (ADS) filed in this matter.

FIELD OF INVENTION

The invention relates to an antenna arrangement for a transceiver arrangement, in particular for a high-frequency transceiver arrangement, preferably for use within a full-duplex communication channel, having a transmit antenna group having a first transmit antenna and a second transmit antenna, and a receive antenna group having a first receive antenna and a second receive antenna.

The invention further relates to a transceiver arrangement, having an antenna arrangement, a transmit unit and a receive unit.

The invention further relates to a communication system, having a first transceiver arrangement and a second transceiver arrangement, for providing wireless signal transmission.

The invention further relates to an actuator device, in particular an industrial robot system, having a first actuator element, a second actuator element and a communication system having a first transceiver arrangement and a second transceiver arrangement.

The invention still further relates to a method for operating an antenna arrangement of a transceiver arrangement, in particular a high-frequency transceiver arrangement.

BACKGROUND OF THE INVENTION

Antenna arrangements consisting of one antenna or a plurality of antennas are used for contactless or wireless energy transmission and/or data transmission. For the simultaneous transmission and reception of electromagnetic waves (referred to as full-duplex operation), i.e. for the use of the antenna arrangement within a communication channel which provides transmission and reception of signals simultaneously at the same frequency (in-band full-duplex), a high electromagnetic attenuation or isolation between the transmitter and receiver within the same transceiver is essential in order to avoid crosstalk or interference between the transmitter and receiver.

Furthermore, in radar applications, it is often necessary for the radar receiver to be ready to receive while the radar transmitter is transmitting radar signals. Since the radar signal is usually transmitted and received at the same frequency, a high electromagnetic attenuation or isolation is required between the transmit antennas and the receive antennas of a radar system.

Different technical approaches are already known for providing adequate electromagnetic isolation between the transmitter and receiver within an in-band full-duplex communication channel. One possibility involves transmission with different polarizations (polarization multiplex/polarization duplex), wherein the two communication partners (also referred to herein as "transceiver arrangements") transmit the electromagnetic waves, for example, with circular polarization, in each case with a different direction of rotation. According to a further technique, the electromagnetic waves emanating from the two communication partners are transmitted with special radiation patterns in order to avoid interference as far as possible between the transmitter and receiver characteristics. A metal shielding between the transmit antennas and receive antennas of a common antenna arrangement can be mentioned as a further example, as proposed in the publication entitled "Circularly Polarized PIFA Array For Simultaneous Transmit And Receive Applications", A. Kee, M. Elmansouri, D. S. Filipovic, 2017 IEEE International Symposium on Antennas and Propagation, pp. 2303-2304.

However, the isolation behavior of the known antenna arrangements is sometimes still not adequate or can be achieved only by means of extraordinarily complex antenna and circuit arrangements incurring substantial manufacturing effort and costs.

In light of the known prior art, one object of the present invention is to provide an antenna arrangement which is improved compared with the prior art and which preferably has substantial isolation characteristics between the transmitter and receiver within the same transceiver, preferably with low complexity.

An object of the invention is also to provide a transceiver arrangement, an improved communication system and an actuator device, with an antenna arrangement which is improved compared with the prior art, preferably with substantial isolation characteristics between the transmitter and receiver within the same transceiver, preferably with low complexity.

The object of the invention is further to provide a method for operating an antenna arrangement of a transceiver arrangement which is improved compared with the prior art and which is preferably suitable for in-band full-duplex transmissions.

An antenna arrangement is provided, in particular for use within a full-duplex communication channel. The antenna arrangement is advantageously suitable for use in a transceiver arrangement, in particular a high-frequency transceiver arrangement.

The antenna arrangement has a transmit antenna group having a first transmit antenna and a second transmit antenna. The first transmit antenna and the second transmit antenna, sometimes referred to herein simply as the "transmit antennas" are preferably planar transmit antennas; where appropriate, however, other antenna designs can also be provided, in particular directional antennas.

A "planar" antenna is understood herein to mean an antenna with a primarily flat and preferably even shape, having, in particular, two preferably parallel-running main areas facing away from one another, i.e., for example, in the form of a disc, a coating or a platelet. In particular, a planar antenna can be a patch antenna or a slot antenna, as proposed herein.

The antenna arrangement further has a receive antenna group having a first receive antenna and a second receive antenna. The first receive antenna and the second receive antenna, sometimes referred to herein simply as the “receive antennas” are preferably planar receive antennas; where appropriate, however, other antenna designs can also be provided, in particular directional antennas.

The transmit antennas and receive antennas are sometimes also mentioned herein without (optional) specifications such as “planar” and are furthermore occasionally summarized using the term “antennas”.

The aforementioned antenna groups (transmit antenna group and receive antenna group) are respective antenna arrays, in particular phased arrays. The transmit antenna group can therefore describe a transmit antenna array, while the receive antenna group can describe a receive antenna array.

The transmit antenna has a first balun (also known as a balancing unit), wherein the first transmit antenna and the second transmit antenna are connected in each case to a symmetric connection (differential connection) of the first balun or are connected to said symmetric connections. The receive antenna group further has a second balun, wherein the first receive antenna and the second receive antenna are connected in each case to a symmetric connection of the second balun or are connected to said symmetric connections. An asymmetric connection (single-ended connection) of the first balun is connectable to a transmit signal path of the transceiver arrangement and an asymmetric connection of the second balun is connectable to a receive signal path of the transceiver arrangement which is independent from the transmit signal path.

A symmetric connection refers to a connection of a symmetric signal transmission, whereas an asymmetric connection refers to a connection of an asymmetric signal transmission.

The transmit antennas are therefore advantageously differentially interconnected and are capable of transmitting a transmit signal fed in via the transmit signal path and having a first carrier frequency band. The receive antennas are similarly differentially interconnected and are capable of forwarding a receive signal having a second carrier frequency band via the receive signal path.

According to the invention, it is provided that the antennas have spatial positions relative to one another such that crosstalk between the transmit antenna group and the receive antenna group is at least reduced by means of the differential connection of their respective antennas. In this respect, various possibilities, which can also be implemented in combination, are set out herein by way of example.

According to the present invention, an antenna arrangement is proposed which as far as possible suppresses the crosstalk between transmit antennas and receive antennas despite their spatial proximity. This can be achieved, in particular, by arranging the two jointly transmitting transmit antennas relative to the receive antennas in such a way that the levels of crosstalk of the two transmit antennas into the receive antennas are equally high, but have inverted signs. The crosstalk having the inverted sign can be achieved by means of an excitation of the two transmit antennas phase-shifted through 180°, for which purpose the aforementioned balancing unit or balun can be used.

It can be provided to achieve the same levels of crosstalk from the transmit antennas to the receive antennas by arranging the two transmit antennas at a geometrically equal distance from the receive antenna. The antennas can preferably be designed such that equally great effective areas or effective edges of the transmit and receive antennas are furthermore located accordingly opposite one another. A number of possibilities are further explained herein.

In one development of the invention, it can be provided that the transmit antennas and the receive antennas are arranged around a common central point.

The common central point of the antennas is sometimes also referred to herein as the “center of rotation”, but this is not intended to mean that the antennas actually rotate or are rotatable around the center of rotation or the central point (although this is optionally quite possible in one advantageous use of the invention described herein).

It can be provided that the two transmit antennas and the two receive antennas are oriented in such a way that their antenna main lobes point in the same direction, preferably parallel. In particular, it can be provided that the phase center of the transmit antenna group coincides with the phase center of the receive antenna group, and preferably further coincides with the common central point.

The directional effect of an antenna is described in terms of its antenna gain. This is often represented in a radiation diagram in spherical coordinates depending on the elevation angle and azimuth angle. In a radiation diagram, the alternation of maxima and minima of the antenna gain produces the “antenna lobes”, wherein the antenna lobe which comprises the global maximum of the antenna gain is referred to as the “antenna main lobe”.

Insofar as the transmit antennas and the receive antennas are designed as planar antennas, it can be provided that the antennas are arranged with their respective main areas parallel to a common base area around the common center of rotation or the common central point.

The antennas can lie on the base area and/or can be attached to the base area. The antennas can also be distanced from the base area or can be incorporated into the electrical assembly having the base area, for example a printed circuit board. The base layer can, for example, be a ground area of a multi-layer printed circuit board (GND plane) or the top layer of a multi-layer printed circuit board.

The two transmit antennas are preferably arranged at the same height or at the same distance from the base area and/or the two receive antennas are arranged at the same height or at the same distance from the base area. All transmit antennas (transmit antennas and receive antennas) are particularly preferably arranged at the same height or at the same distance from the base area.

The common center of rotation or the common central point is preferably designed as the central point of an imaginary connecting line between the two central points or geometric centers of the two transmit antennas. The center of rotation is therefore preferably located centrally between the two transmit antennas.

It can be provided that the transmit antennas and/or the receive antennas are arranged rotated through 180° relative to one another around the center of rotation or the common central point. Said rotation of the antennas can relate, inter alia, to the geometric shape of the antenna per se (e.g. the relative alignment of the axes of symmetry or other axes of the main areas of planar antennas also mentioned below) and/or to the feed-in point or the route of the feed line that leads to the respective antenna.

In one development of the invention, it can be provided that each of the receive antennas has the same center-to-center distance to both transmit antennas.

The "center" or "central point" of an antenna, on the basis of which, for example, the center-to-center distance is determined, is to be understood here to mean, in particular, the geometric center of the respective antenna.

The antenna arrangement is advantageously particularly suitable if the two transmit antennas are excited in phase opposition.

The inventors have recognized that highly effective isolation characteristics can be achieved between the transmitter and the receiver or between the transmit antennas and the receive antennas of the same transceiver by means of a pairwise differential excitation of the transmit antennas.

With crosstalk of the transmit signal into the receive antennas phase-shifted through 180°, the proposed arrangement of the transmit antennas results in compensation of the electromagnetic waves producing the crosstalk from the transmit antennas.

The proposed invention enables the reliable transmission of data in full-duplex operation, even with an offset between the communication partners. In particular, it can be provided that the two communication partners; have a rotatory offset relative to one another, i.e. are rotated around a common axis of rotation so that the transmit antennas of the one communication partner are not oriented in line with the receive antennas of the other communication partner; and/or have a translational offset relative to one another, i.e., starting from a target distance between the two central points of the respective antenna arrangements, are moved further apart from one another or are brought closer together; and/or have an axial offset relative to another, i.e. an offset between the respective central axes running through the central points of the antenna arrangements so that the central axes of the antenna arrangements deviate from a coaxial alignment; and/or have a radial offset relative to one another, i.e. are tilted starting from a parallel alignment of the antenna arrangements.

A corresponding offset can occur due to tolerances or can be provided explicitly on an application-related basis.

In particular, it can also be provided that an offset occurs only during the data transmission or is deliberately introduced, for example through targeted rotation of the communication partners.

The complexity of the proposed antenna arrangement is low, thus enabling a technically simple and economical implementation. The invention therefore enables a cost-optimized design of a full-duplex communication antenna arrangement or a radar antenna arrangement, for example using standard printed circuit board processes. The proposed antenna arrangement is simply integrable into any electronic assemblies.

In one particularly preferred development of the invention, the two transmit antennas are based on the same basic geometric shape. In particular, it can be provided that planar transmit antennas are based on the same basic shape of their main areas. The two transmit antennas preferably have an identical design, particularly in terms of geometry, material and/or position of the feed-in point on the main area.

However, the two transmit antennas can essentially also have a different design, but preferably at least a similar design—particularly insofar as this is technically feasible. The attenuation in relation to the receive antennas can be further improved through an identical or at least essentially identical design of the transmit antennas.

The two receive antennas are also preferably, but not necessarily, based on the same basic geometric shape, in particular the same basic shape as that of the transmit antennas (again preferably in relation to the main areas of a planar antenna). The receive antennas preferably have an identical or at least essentially identical design, particularly preferably a design that is identical or at least essentially identical to that of the transmit antennas, particularly in terms of geometry, material and/or position of the feed-in point on the respective main area of the antenna.

The invention can essentially be suitable for transmitting any electromagnetic waves having any wavelengths or frequencies. However, the invention is particularly advantageously suitable for transmitting electromagnetic waves in the frequency range between 40 GHz and 80 GHz, preferably between 50 GHz and 70 GHz, particularly preferably between 55 GHz and 65 GHz. The high carrier frequencies can result in a very high data rate in the short-range signal transmission, thus making the proposed antenna arrangement particularly advantageously suitable for contactless electrical connectors in order to replace a conventional plug-in connection. This advantageous application of the invention will be examined in more detail herein.

The transmission at correspondingly high frequencies further offers the advantage that the free-space attenuation increases with increasing frequency (the free-space attenuation increases proportionally to the square of the carrier frequency). The signals of the proposed antenna arrangement which escape into the environment thereof thus fade comparatively quickly. Furthermore, interference signals occurring within the bandwidth reach the antenna arrangement with only a low amplitude. The characteristic of the signals quickly losing power density at high frequencies is therefore advantageously utilized according to the invention.

The bandwidth of the transmission can, for example, be 3 GHz to 20 GHz, in particular approximately 10 GHz.

It can be provided that the first transmit antenna is arranged in the near field of the second transmit antenna, preferably at a maximum distance from the second transmit antenna of half a free-space wavelength of an electromagnetic wave to be transmitted. The formation of antenna side lobes can be avoided in this way.

In one advantageous development of the invention, it can be provided that the receive antennas and the transmit antennas are arranged, relative to one another, in such a way that the center-to-center distance between each transmit antenna and receive antenna is in each case less than half the wavelength of the electromagnetic wave to be transmitted.

The first receive antenna (and optionally the second receive antenna also) is arranged rotated through 90° around the common center of rotation or the common central point relative to the transmit antennas.

It can be provided that a transmit antenna and a receive antenna are arranged alternately in each case circulating around the common center of rotation or the common central point, wherein each antenna is rotated through 90° relative to its upstream antenna. All antennas along the circumference are preferably rotated in the same direction of rotation.

The central points of all antennas are preferably arranged on a common, imaginary circumference, the central point of which coincides with the center of rotation or the common central point of the antennas. The antenna central points can therefore preferably have the same radial distance to the common central point.

In one advantageous design of the invention, it can be provided that the antennas, in particular the planar antennas also specified herein, are co-polarized. Co-polarization is understood to mean, for example, that all antennas are either right-circularly polarized, left-circularly polarized, linearly vertically polarized or linearly horizontally polarized.

In connection with the proposed antenna arrangement, the inventors have surprisingly recognized that a co-polarization can be advantageous compared with an otherwise usual cross-polarization. A cross-polarization is normally chosen in order to reduce crosstalk from transmit antennas to receive antennas. However, if the receive antennas are comparatively closely adjacent to the transmit antennas (if the distance is, for example, less than or equal to half a free-space wavelength), the receive antennas are located in the near field of the transmit antennas. In the near field, the electromagnetic wave is not yet transversally electromagnetic, so that no formed circular polarization can yet be present in the near field. In this respect, cross-polarization would not result in an improvement in the isolation of the antennas. Co-polarization, however, can result in an improved isolation from reflection components. In the case of a simple reflection, e.g. on an electrically conductive surface, the direction of rotation changes for a circularly polarized electromagnetic wave. If transmit antennas and receive antennas are then co-polarized in relation to one another, a simple reflection component arriving at the receive antennas (for example due to a simple reflection on the opposite communication partner) is cross-polarized in relation to the receive antennas, as a result of which the unwanted reception of the reflection component is substantially reduced and the receive antennas are therefore more effectively isolated from the transmit antennas in relation to propagation paths with a single or odd number of reflection points.

In particular, suppression of the reception of such reflection components can be relevant in the case of a contactless data plug or a contactless vector. A contactless connector of this type can comprise two of the transceiver arrangements claimed here which are located in close proximity opposite one another and are at a distance of e.g. less than 10 cm (or even less than 5 cm). Due to the short distance and the lateral extension—which is relatively large in relation to the distance—of printed circuit boards of the transceiver arrangements onto which the transmit antennas and receive antennas are fitted, the reflection components can, for example, have a high amplitude in the case of a contactless connector so that it is advantageous to suppress the unwanted reception of said reflection components.

It can be provided that the transmit antennas and/or receive antennas are designed as directional antennas, the main radiation directions of which are aligned in the same spatial direction, preferably aligned in parallel. In one development of the invention, it can be provided, in particular, that the antennas are designed as planar antennas, the main areas of which are aligned parallel to the aforementioned base area, preferably parallel to a side area of an electrical printed circuit board to which they are electrically and mechanically connected.

In one advantageous development, it can be provided that the main areas of the planar antennas have an elongated geometry, preferably a rectangular or elliptical geometry.

A triangular geometry (even an equilateral, i.e. not elongated, triangle) can also be provided. Furthermore, geometries with asymmetries incorporated in a targeted manner can also be provided, such as chamfered corners, indents or slots, wherein asymmetries of this type can also be provided in basic geometric shapes which do not have an elongated form.

In one development of the invention, it can be provided that each of the planar antennas has precisely one feed-in point.

The antennas can preferably be circularly polarized, particularly if the antennas are designed as planar antennas, and quite particularly if the planar antennas in each case have precisely one feed-in point only. The geometric shape of the antenna and any asymmetries incorporated into the geometric shape can be designed accordingly.

Due to the circular polarization, which means that the vectors of electrical and magnetic field strength of the electromagnetic wave to be transmitted rotate continuously, an independence of the signal transmission strength from the angle of rotation of the communication partners, e.g. two transceiver arrangements, can be achieved at a distance of, for example, less than 10 cm of a contactless electrical connector in relation to one another.

According to one development of the invention, it can be provided that each of the planar antennas is designed such that its main area has a finite, non-zero number of axes of symmetry, preferably precisely two axes of symmetry or precisely three axes of symmetry.

In particular, it can be provided that the antenna has a geometry other than a circle.

According to one development of the invention, it can be provided that the planar antennas in each case form an orientation angle between a main axis of symmetry which is the longest of the axes of symmetry of the corresponding planar antenna (in particular an axis of symmetry aligned in the longitudinal direction of the main area or aligned diagonally on the main area), and a straight line which runs between the geometric center of the corresponding planar antenna and the common central point of the antennas, and wherein the planar antennas are aligned relative to another in such a way that the angles of orientation of all planar antennas are at least essentially identical, and preferably identical.

The orientation angle of all antennas can be, for example, 40° to 50°, preferably 43° to 47°, particularly preferably essentially 45°, or precisely 45°.

It should be mentioned at this point that two angles which differ from one another are essentially formed between the main axis of symmetry and the straight line defined above of a respective antenna if the orientation is not exactly 45° (an obtuse angle, i.e. greater than 90°, and an acute angle, i.e. less than 90°). In this case, the same selection criterion must always be used to determine the "orientation angle" for all antennas, i.e., for example, whereby the orientation angle in the case of all antennas is the angle which is enclosed in the clockwise direction (or alternatively in the counterclockwise direction), starting from the straight line between the straight line and the main axis of symmetry. The starting point (i.e., for example, the straight line or the main axis of symmetry) and the direction of rotation (i.e., for example, in the clockwise direction or in the counterclockwise direction) should be chosen as the same for all antennas in order to define their respective orientation angle. This very orientation angle is then preferably identical or at least essentially identical for all antennas. The "clockwise direction" is to be understood in relation to the common central point of the antennas.

It can be provided that the main axes of symmetry of the transmit antennas and the receive antennas run orthogonally to one another. The individual antennas are preferably arranged in such way that the transmit antennas and the receive antennas are located opposite one another in each case with a narrow side and a long side.

In one design of the invention, it can be provided that the antennas have a respective eccentrically offset feed-in point, wherein the respective eccentric offset (distance to the central point and/or position on the main area) is identical in all antennas.

Impedance matching can be enabled by means of the eccentrically offset feed-in point. The feed-in point is preferably chosen such that the input impedance is 50 Ohm.

The feed-in point of a respective antenna can preferably be arranged on the main axis of symmetry of said antenna. However, any arrangement of the feed-in point on the main area of the respective antenna can essentially be provided, in particular also a position of the feed-in point on a straight line which runs on the main area and through the central point or center of the main area and which forms an angle of 45° relative to the main axis of symmetry.

In one development of the invention, it can be provided that a respective feed line is capacitively coupled to each of the planar antennas. The electromagnetic wave can therefore be injected from a respective feed line in a near-field coupling (preferably primarily capacitive) into the transmit antennas and can be extracted in a near-field coupling (preferably primarily capacitive) from the receive antennas. The feed line can be incorporated, in particular, inside the electrical assembly forming the base area, in particular a printed circuit board.

In order to form an optimal circular polarization of each individual transmit antenna and/or receive antenna, the feed line assigned to the respective antenna can be arranged at an angle of essentially 45° to the main axis of symmetry of the main area of the respective antenna and can be capacitively coupled to the respective antenna.

A preferably primarily capacitive feed-in and feed-out of the electromagnetic wave based on an electromagnetic near-field coupling is particularly advantageous for predefining the feed-in point in a particularly flexible manner.

However, an injection and extraction can essentially be performed in a different manner also.

It can be provided, for example, that the electromagnetic wave is injected from a feed line (e.g. a microstrip line of a printed circuit board) leading directly into the antenna (in particular into the main area thereof). A direct galvanic feed-in and feed-out on the same plane to the respective antenna can therefore be provided.

It can also be provided that the electromagnetic wave is injected from a through-connection (via) leading directly into the antenna (in particular into the main area thereof) which is directly or indirectly connected to a feed line running at a different height. However, one advantage of the capacitive coupling described above compared with the coupling via a through-connection can be precisely the elimination of the need for this through-connection. Generally speaking, the etching process in printed circuit board manufacturing is more precise than the positioning of the through-connections. The problem of the positioning tolerance of the through-connection can therefore be avoided by means of the capacitive coupling. In the case of a manufacturing-related offset of the through-connections, the rotational symmetry of the antenna arrangement can be upset, although this can be crucial in determining that the level of the crosstalk from the first transmit antenna to the receive antennas corresponds to the level of the crosstalk from the second transmit antenna into the receive antennas. If the problem of the through-connection is therefore removed, the rotational symmetry of the antenna arrangement can be more effectively ensured. This can ultimately improve the isolation between the transmit antennas and receive antennas.

It can furthermore be provided that the electromagnetic wave is injected by means of at least one intermediate antenna which is arranged parallel to the main area and the feed line and is located in a plane between the main area and the feed line. A stacked arrangement with one or more intermediate antennas can therefore be provided, for example a stacked arrangement of a plurality of intermediate antennas designed as patch antennas and/or slot antennas in a common printed circuit board. The transmission bandwidth can optionally be further increased by means of the stacked antenna arrangement.

Any antenna structure which is capable of generating or receiving circularly polarized electromagnetic waves can essentially be usable. However, a linear polarization is essentially also possible, particularly if a reciprocal rotation of the communication partners is not to be assumed.

The feed line can broaden in the direction of the feed-in point in order to enable impedance matching.

In order to implement an even more advantageous radiation pattern, in particular a directional radiation of the electromagnetic wave along a main radiation direction, it can be provided that a metal or electrically conductive reference electrode structure or ground plate is formed on the side of the antenna facing away from the desired main radiation direction, i.e. "underneath" the antenna. The ground plate can be formed, for example, as the metallized underside of a printed circuit board, on the upper side of which the main areas of the antenna are formed.

In one advantageous development of the invention, it can be provided that the antennas are designed as patch antennas or slot antennas.

The antennas are preferably designed as patch antennas. The patch antennas can be designed, in particular, as metallized areas on or in a printed circuit board. Conversely, the slot antennas can be designed in a complementary manner as corresponding indents of metallized areas of a printed circuit board.

The use of patch antennas or slot antennas is merely one advantageous possibility for implementing the antenna arrangement according to the invention. The use of horn antennas, for example only, and without limitation, is also possible.

The patch antennas or slot antennas are preferably manufactured by means of printed circuit board manufacturing processes in an additive and/or subtractive layer technology. However, the individual antennas can also be manufactured separately, for example only, and without limitation, by means of deep-drawing or punching and bending processes.

In one development of the invention, it can be provided that the respective main areas of the antennas have an elliptical geometry. A rectangular geometry (with different side lengths or square) can similarly be provided, for example with precisely one pair of chamfered corners lying diagonally opposite one another, in particular with a square geometry.

Further geometries can essentially also be provided, for example a triangular geometry, a circular geometry (in particular with punched out or recessed peripheral areas, for example square punched out peripheral areas) or other geometries.

However, the elliptical geometry is preferred since a particularly advantageous radiation pattern is thereby achievable. In particular, a preferably completely circularly polarized electromagnetic wave can be radiated by means of the elliptical geometry, with an axial ratio of ideally 1.0. One particular advantage of the elliptical geometry is, on the one hand, the small area requirement—compared with other geometries—and the possibility of generating a circular polarization with only one single feed-in point. Linearly polarized components can be avoided as far as possible by means of the elliptical geometry, and for this reason the elliptical geometry can also enable the most energy-efficient antenna arrangement.

In the case of a patch antenna, the metallized areas can have the corresponding geometry (elliptical, rectangular, etc.). In the case of a slot antenna, the corresponding indent in the metallized area can have the aforementioned geometries.

In one development, it can also be provided that the antenna arrangement has a shielding arrangement which is arranged around the transmit antennas and the receive antennas.

The shielding arrangement preferably forms a shielding casing enveloping the antennas in an essentially tubular form running orthogonally to the base area. The shielding arrangement can be formed, in particular, from individual through-connections which extend through an electrical assembly (e.g. a printed circuit board) forming the base area, preferably in a uniform arrangement, particularly preferably in two or more rows, and quite particularly preferably at the same distances from one another.

The shielding arrangement is preferably arranged equally symmetrically in relation to all antennas.

Since the antenna arrangement has the aforementioned shielding arrangement, the antenna arrangement can be shielded from the environment and furthermore the electromagnetic isolation can additionally be increased. A quasi-coaxial structure for the feed-in and feed-out paths can preferably be implementable by means of the shielding arrangement.

The antenna arrangement is preferably arranged on an electrical printed circuit board. The substrate material of the printed circuit board can be, for example only, and without limitation, the composite material FR-4 (composite material consisting of fiberglass in epoxy resin) in order to provide a particularly economical antenna arrangement. Alternatively, the substrate material can also be formed as a composite of ceramic particles (Teflon) and fiberglass in epoxy resin in order to minimize dielectric losses.

Depending on the application, it can occur that the transmission channel established between two transceiver arrangements is affected by distortions which are caused by reflections of the electromagnetic wave transporting the data signal. Reflections can occur on all objects which the electromagnetic wave hits during its transmission. Due to the reflections, the useful signal is transmitted from the one transceiver arrangement to the other not only on a direct path via the line-of-sight component, but also via a plurality of propagation paths which are formed by the reflection components of the transmission. This is referred to as multipath propagation or a multipath channel. Due to the multipath propagation, the line-of-sight component interferes on the receive antennas of the opposite transceiver arrangement with the reflection components so that the receive signal can be distorted in terms of amount and phase. As a result, it becomes more difficult for the receiver to detect the receive signal without error. Along with the distortions, the multipath propagation also causes the problem of destructive interference on the receiver, since the line-of-sight component can be cancelled out by a reflection component shifted through 180° relative to it, and can therefore lose a substantial amount of power.

Particularly if the transceiver arrangements are located in close proximity opposite one another (e.g. less than 10 cm apart), as in the case, for example, of the contactless electrical connector explained below, it can occur that the reflection takes place on the base areas of the electrical assembly (e.g. printed circuit boards) to which the antennas are attached, since assemblies of this type sometimes constitute good reflectors. In the transmission from the first to the second transceiver arrangement, the signal can therefore arrive via the line-of-sight component at the second transceiver arrangement where it is reflected in the direction of the first transceiver arrangement. Back once more at the first transceiver arrangement, the signal can again be reflected there and can be bounced back to the receive antennas of the second transceiver arrangement where it finally interferes with the line-of-sight component.

It can optionally be provided to minimize the effects of the multipath propagation as far as possible in order to improve the signal transmission quality. In this respect, a signal processing component of the transceiver arrangement can be provided, in particular a digital signal processing component, for equalization or pre-emphasis.

However, in one advantageous development of the invention, it can be provided, in particular, that the antenna arrangement has an attenuation arrangement arranged around the antennas. The attenuation arrangement preferably surrounds the antennas in a radial direction, for example in a symmetrical arrangement around the antennas.

It has become evident that channel distortions can advantageously be reduced by means of the attenuation arrangement without the use of the aforementioned signal processing component being absolutely necessary. A considerable amount of energy that would otherwise be required to supply the digital signal processing component can therefore additionally be saved in the signal transmission. Energy efficiency can be advantageous above all in the case of a contactless data plug or a contactless connector since the latter competes with contact-making data plugs which are often passive and therefore often have no energy requirement. Energy efficiency can furthermore substantially simplify the heat dissipation of a contactless connector and therefore its integration into data transmission systems.

High-frequency attenuation materials (also referred to as RF absorbers) are preferably used. This attenuation material, normally used in the form of absorber sheets, is preferably fitted on at least one, preferably both, communication partners, in particular around their antennas. The attenuation arrangement can ensure that little or no radiation is reflected on the surface of the electrical assembly or printed circuit board.

The attenuation arrangement can have at least one first attenuation unit with an access opening, wherein the antennas are arranged together inside the access opening. The central axis of the access opening can preferably run along a main radiation direction of the antenna arrangement and/or through the common central point of the antennas.

The attenuation arrangement or the attenuation unit preferably does not extend between the antennas of the antenna arrangement. No attenuation material is preferably provided between the antennas.

The attenuation arrangement is preferably arranged on the base area, in particular on a side area of a printed circuit board on which the antennas are also formed. The attenuation arrangement or its components (e.g. the attenuation units) can be attached, for example, as firmly bonded, in particular glued, onto the base area, wherein, additionally or alternatively, a force-fitted and/or form-fitted attachment can also be provided.

The attenuation arrangement can also be axially distanced from the base area, or can be embedded at least in sections in the base area, i.e., formed, for example, inside a printed circuit board.

It should be mentioned at this point that the definition according to which the attenuation arrangement is arranged around the antennas is preferably to be understood as referring to a top view onto the base area or onto the antennas, so that the attenuation arrangement surrounds the antennas radially or in an annular form. It is not absolutely necessary for the attenuation arrangement to cover the antennas also in an axial direction or laterally.

In one development, it can be provided that the attenuation arrangement has a second attenuation unit with an access opening, inside which said antennas are arranged together. In particular, it can be provided that the first attenuation unit and the second attenuation unit are arranged concentrically.

The first attenuation unit and the second attenuation unit preferably differ from one another geometrically and or in terms of their respective material composition/structural composition.

The attenuation arrangement or components of the attenuation arrangement, such as, for example, the first attenuation unit and/or the second attenuation unit, can also can have a primarily flat geometry, preferably plate-shaped, particularly in the form of absorber sheets. However, any design can essentially be provided, such as also, for example, a pyramid-shaped arrangement or design of the attenuation arrangement or its components.

It can be provided that the access opening of the first attenuation unit and/or the second attenuation unit has a circular or square design. However, any polygonal or other geometric shape can essentially be provided for the access opening. A circular access opening is normally to be preferred, since a possibly interfering influence on an optional circular polarization can be reduced through the rotational symmetry.

It can be provided that the periphery of the access opening of the first attenuation unit and/or the second attenuation unit, and also an extension of the first attenuation unit and/or the second attenuation unit along the central axis is designed such that an antenna main lobe of one of the antennas is not covered by the attenuation arrangement in the main radiation direction (in a top view onto the antennas or the base area/printed circuit board).

The access opening(s) to the antennas is/are preferably designed to be as small as possible without intersecting the antenna main lobe. A small opening in the attenuation material offers the advantage that reflections on the printed circuit board on which the antennas are preferably arranged are effectively suppressed.

In one development of the invention, it can be provided that a transverse extension of the access opening (e.g. a radius of a circular access opening or a diagonal of a square access opening) of the first attenuation unit and/or the second attenuation unit is at most 2.0 free-space wavelengths of an electromagnetic wave to be transmitted with the antenna arrangement.

In one advantageous development, it can be provided that the first attenuation unit is arranged inside the access opening of the second attenuation unit.

The first attenuation unit can preferably be essentially custom-fit, particularly preferably custom-fit, inside the second attenuation arrangement. No air gap or other gap therefore preferably remains between the two attenuation units.

In this way, essentially any number of attenuation units arranged within one another can be provided, i.e., for example, a third attenuation unit in which the second attenuation unit is arranged together with the first attenuation unit, etc.

In one development of the invention, it can be provided that the second attenuation unit has a greater extension along the central axis than the first attenuation unit. The second attenuation unit is therefore preferably higher than the first attenuation unit. This is advantageous particularly if the first attenuation unit is arranged inside the second attenuation unit, since an overall structure can thereby be provided which gives the antenna lobes of the transmit antenna group and the receive antenna group sufficient space for expansion in the main radiation direction without the antenna lobes intersecting one of the attenuation units in the top view, wherein the attenuation units are simultaneously able to provide a good covering and therefore attenuation.

It can be provided that the first attenuation unit and/or the second attenuation unit has a loss-based absorber (also referred to as a “broadband absorber”) and/or a resonance-based absorber (also referred to as a “narrowband absorber”).

In the case of loss-based materials, the reflection attenuation can be achieved through dielectric and/or magnetic losses within the attenuation material. Attenuation materials of this type are, for example, foam plastics, such as those made from polyurethane, or elastomers, such as silicone or nitrile polymers, which can be provided with lossy materials, such as, for example only, and without limitation, carbon powder or ferrite powder.

The loss-based absorbers can therefore have a dielectric carrier material, in particular made from a foam plastic or an elastomer which is provided with a granular, electrically conductive foreign material, in particular a carbon powder or ferrite powder.

The loss-based absorber can optionally form a layered or continuous impedance gradient running in an axial direction. By means of a multi-layered structure or by changing the dielectric and/or magnetic characteristics of the material into the depth of the material, an impedance gradient can be set which continuously reduces the free-space characteristic impedance (of around 377 ohm). Due to this impedance matching, an electromagnetic wave hitting the material is not reflected at the air-to-absorber interface. Instead, it is guided into the absorber and, with progressive penetration, is increasingly attenuated as a result of dielectric or magnetic losses of the absorber.

Pyramid-shaped RF absorbers, which can essentially also be provided, are also based on the concept of the gradual change in the field characteristic impedance.

The resonance-based absorber can have a dielectric carrier material, in particular made from a foam plastic or an elastomer, on the side of which facing away from the main radiation direction of the antennas an electrically conductive reflection area can be formed, in particular a metal coating or a metal foil.

In the case of resonance-based attenuation materials which can similarly be based, for example, on silicones, nitriles or polyurethanes, a second reflection component which is phase-shifted through 180° relative to a first reflection component which occurs at the air-to-attenuation material interface can be generated on a metallization area arranged under the attenuation material. The first reflection component and the second reflection component can then cancel one another out.

In one particularly advantageous development of the invention, it can be provided that the second attenuation unit has a loss-based absorber and the first attenuation unit has a resonance-based absorber. This combination is advantageous particularly if the first attenuation unit is arranged inside the second attenuation unit, and particularly if the second attenuation unit has a greater axial extension than the first attenuation unit. Especially with a carrier frequency of more than 20 GHz, in particular of more than 50 GHz, very thin resonance-based attenuation materials can be implemented. The resulting small axial extension of a first attenuation unit implemented with a resonance-based attenuation material can in turn have a favorable impact on an optional circular polarization of the antennas since the first attenuation unit then impinges minimally on the radiation field of the antennas.

A thin attenuation material, for example, or a thin first attenuation unit (e.g. 0.5 mm to 2 mm thick) which, due to its thin design, has little influence on the antenna characteristic (such as the antenna gain and the polarization of the antennas) can be arranged in the immediate vicinity in a first ring around the antennas. This can be enabled, for example, by a resonance-based attenuation material or a thin elastomer-based, broadband attenuation material. The resonance-based attenuation material offers the advantage of being more economical, and thin. Along with its greater absorption bandwidth, the broadband material offers the advantage that it can effectively absorb non-orthogonally incident electromagnetic radiation also. A second attenuation material or the second attenuation unit which is thicker (e.g. >2 mm) and economical and also effectively absorbs non-orthogonally incident electromagnetic radiation, as in the case, for example, of a broadband foam plastic absorber, can be arranged in a second ring around the antennas.

It can be provided that a diameter or a side length of the attenuation arrangement is at most 6 free-space wavelengths and at least 3 free-space wavelengths of an electromagnetic wave to be transmitted with the antenna arrangement.

The invention also relates to a transceiver arrangement, having an antenna arrangement according to the descriptions herein above-and-below and also the transmit signal path and the receive signal path, wherein the asymmetric connection of the first balun is connected to the transmit signal path and the asymmetric connection of the second balun is connected to the receive signal path. The transmit signal path has a transmit unit and the receive signal path has a receive unit which can be components of a common circuit arrangement. The transmit unit is connected to the two transmit antennas via the first balun in order to radiate an electromagnetic wave through differential excitation of the two transmit antennas. The receive unit is connected via the second balun to the receive antennas in order to receive an electromagnetic wave via the receive antennas.

The single-ended connection (i.e. the connection for the asymmetric signal transmission) of the first balun is therefore preferably connected to the HF output of the transmit unit or of the transmitter, and a differential connection (i.e. a connection for the symmetric signal transmission) of the first balun is connected in each case to the transmit antennas. The single-ended connection of the second balun is preferably further connected to the HF input of the receive unit or of the receiver, and a differential connection of the second balun is connected in each case to the receive antennas.

A transceiver arrangement can advantageously be provided having an antenna arrangement which is suitable for the simultaneous bidirectional transmission of data (full-duplex) in the same frequency band (in-band full-duplex) and independently from the reciprocal rotation or alignment of the communication partners relative to one another. A rotation, for example, of the two communication partners around the common central point of the antennas can be possible during the transmission, particularly if the two communication partners are arranged concentrically to one another so that the axes of rotation with the common central point of the antennas and the axis of rotation of the respective other communication partner coincide to form a common rotational symmetry center. Each communication partner comprises a transceiver arrangement according to the descriptions herein above and below.

Data can be transmitted by means of the proposed transceiver arrangement independently from the orientation or alignment of two communication partners or a first and a second transceiver arrangement, with a simultaneously simple technical design of the antenna arrangement. The invention can advantageously be implemented using conventional printed circuit board technology, wherein, however, other manufacturing technologies are essentially possible, for example using a waveguide.

The balun, or balancing unit, can preferably be designed as a 180° hybrid coupler (also known as a rat-race coupler or ring coupler). Alternatively, however, a different structure can be provided, in particular a Marchand balun. However, other implementation forms are also possible. A 90° hybrid coupler, for example, can be provided, at the second output gate of which, said second output gate being phase-shifted through 90° relative to the first output gate, a line having an electrical length of 90° (i.e. ¼ of the free-space wavelength of the electromagnetic wave to be transmitted) is connected. A Wilkinson divider can further be provided, at the first output of which a first antenna feed line is connected, the electrical length of which is 180° longer than the electrical length of a second antenna feed line which is connected to a second output of the Wilkinson divider. A magic tee can also be provided.

In one particularly advantageous development of the invention, it can be provided that the transmit unit and the receive unit are designed to enable in-band full-duplex communication. In another contemplated a design of the present disclosure, the transmit unit and the receive unit can be components of a radar system.

The transmit unit is preferably designed to transmit a transmit signal with a first carrier frequency band, wherein the receive unit is designed to receive a receive signal with a second carrier frequency band, wherein the first carrier frequency band and the second carrier frequency band are at least partially spectrally superimposed, preferably completely spectrally superimposed, on one another, and wherein the receive unit is designed to receive the receive signal while the transmit unit transmits the transmit signal.

In one embodiment of the invention, it can be provided that the receive unit is designed to carry out an incoherent demodulation. The receive unit can preferably have an envelope detector to carry out the incoherent demodulation.

Particularly if the aim is to achieve a high data rate in the signal transmission, a coherent transmission method is normally preferred. However, the inventors have recognized that an incoherent demodulation method can be more suitable here due to a significantly reduced power consumption. In order to simultaneously retain a high data rate, the in-band full-duplex transmission proposed herein and advantageously usable due to the high attenuation characteristics of the antenna arrangement according to the invention can be used. The high attenuation characteristics can be achieved by the first and, optionally in addition, the second attenuation unit.

In one embodiment of the invention, it can further be provided that the transmit unit has a freewheeling, voltage-controlled oscillator to generate a carrier frequency for the signal transmission.

The use of a freewheeling oscillator can result in a simple, power-saving design of the transceiver arrangement. In particular, a complex phase-locked loop requiring installation space and electric power can be dispensed with. The receive signal path of the transceiver arrangement can correspondingly get by without an oscillator, which again saves power and installation space, particularly if the receive signal path carries out an incoherent demodulation and has a corresponding envelope detector.

It can be provided to use only a two-stage, double-sideband amplitude modulation for further simplification of the transceiver arrangement. In particular, a complex modulation method, such as a quadrature amplitude modulation, can be dispensed with.

The maximum transmit power of the transmit unit can preferably be less than 30 dBm, preferably less than 27 dBm, particularly preferably less than 20 dBm, quite particularly preferably less than 10 dBm, further preferably less than 2 dBm.

The transmit power can be set, e.g. via a working point setting of a transmit signal final stage amplifier of the transmit signal path.

The transmit unit of the transceiver arrangement can comprise a first signal processing component (more precisely a transmit signal processing component). This transmit signal processing component can comprise an upconverter which converts a transmit baseband signal into a carrier frequency range. A local oscillator signal for the upconverter can be provided by an oscillator circuit of the transmit signal processing component. The transmit signal processing component can further comprise a transmit signal final stage amplifier which is connected to the high-frequency output (HF output for short) of the transmit signal processing component. The transmit signal processing component can optionally comprise a transmit filter, e.g. a bandpass filter, which is connected between the output of the transmit signal final stage amplifier and the HF output of the transmit signal processing component.

The receive unit can comprise a second signal processing component (more precisely a receive signal processing component). This receive signal processing component can comprise a receive filter at its high-frequency input (HF input for short) which can be implemented as a bandpass filter. The receive signal processing component can further comprise a low-noise preamplifier which can be connected to the high-frequency input of the receive signal processing component. The low-noise preamplifier is connected, for example, to the output of the receive filter. The receive signal processing component can further comprise a downconverter which can convert the receive signal from a carrier frequency range into the baseband or to an intermediate frequency. This downconverter can be implemented e.g. as an envelope detector, or can be supplied with a local oscillator signal by an optional local oscillator circuit of the receive signal processing component.

In one exemplary embodiment, neither the transmit signal processing component nor the receive signal processing component comprises devices for digital signal processing, in particular no devices for radio channel estimation, for digital pre-emphasis of the transmit signal or for equalization of the receive signal. This can result in a power saving of the transceiver arrangement.

In particular, a carrier frequency of 10 GHz or more can be provided for the data transmission, preferably of 30 GHz or more, particularly preferably of 60 GHz or more. The voltage-controlled oscillator of the transmit unit can preferably be designed to generate a carrier oscillation at the above-mentioned carrier frequencies.

In one exemplary embodiment of a contactless electrical connector in which a first and a second transceiver arrangement are arranged opposite one another, a distance between them is less than 10 cm and a carrier frequency of more than 50 GHz is provided, the maximum transmit power is preferably less than 0 dBm. The first and the second transceiver arrangement are preferably connected by means of in-band full-duplex communication.

The size of antennas is generally scaled with the operating wavelength that is used. One particular advantage of the aforementioned, comparatively high carrier frequencies, along with the associated high data rate of the signal transmission, can also be found in the small wavelengths of the electromagnetic waves, thus enabling the antennas and the structures involved to be designed as correspondingly small, so that the invention can advantageously be suitable for implementing a contactless connector with small space requirements, as proposed herein.

Particularly if a correspondingly high carrier frequency is chosen, the data rate in the signal transmission can be greater than 0.2 Gbit/s, preferably greater than 0.5 Gbit/s, particularly preferably greater than 1.0 Gbit/s.

The invention also relates to a communication system, having a first transceiver arrangement and a second transceiver arrangement, in each case according to the descriptions above and below, for providing wireless signal transmission between the respective circuit arrangements of the transceiver arrangements, in particular for providing an in-band full-duplex communication channel between the transceiver arrangements.

A compact, energy-efficient in-band full-duplex communication system can advantageously be provided with transmit and receive antennas, isolated from one another, of a respective communication partner, said system enabling very fast data transmission with mechanical rotation over very short distances in confined installation spaces.

The communication system according to the invention can particularly advantageously be usable for wireless transmission between electrical devices arranged movable relative to one another, preferably as a substitute for sliding contacts. The proposed communication system can be advantageous if the two communication partners, i.e. the first transceiver arrangement and the second transceiver arrangement, have a variable or unknown angle of rotation relative to one another in operation, so that the transmit antennas and receive antennas are not always alignable with one another in a defined manner.

The communication system according to the invention can be suitable, in particular, for use with motors or rotating machines or linear actuators. Possible fields of application relate to energy technology (for example wind turbines and generators) and vehicle technology (in particular electric motors, generators, adjustable equipment such as seats, wing mirrors or even automobile doors). The invention is also particularly advantageously suitable for use in robotics in the field of articulated joints, in medical technology or generally in industry, in particular also if hermetically sealed systems are provided.

In one advantageous development, it can be provided that the two transceiver arrangements are arranged a maximum of 10 centimeters apart from one another for the wireless signal transmission, preferably a maximum of 5 centimeters apart from one another, particularly preferably a maximum of 2 centimeters apart from one another, quite particularly preferably a maximum of 1 centimeter apart from one another, and even further preferably a maximum of 0.5 centimeters apart from one another, for example between 1.0 millimeters to 3.0 centimeters apart from one another.

The distance between the transceiver arrangements can be defined as the shortest distance between the common central point of the transmit antenna group of the first transceiver arrangement and the common central point of the receive antenna group of the second transceiver arrangement.

It is therefore proposed to use antennas for transmission over comparatively short distances. This is contrary to known approaches of the technology, in which systems based on cross-coupling between adjacent conductors, for example through the use of waveguides, are normally used for short transmission distances. Conversely, antennas are waveform converters which convert line-conducted electromagnetic waves into free-space waves—and vice versa. They are therefore normally unsuitable for contactless data transmission over very short distances. However, the disadvantages can be overcome by means of the proposed antenna arrangement, as a result of which an economical, small system can be implemented with low power consumption and high electromagnetic compatibility. Due to the inherent attenuation characteristics of the antenna arrangement and the associated possibility of in-band full-duplex operation, high data rates can further be achieved in the signal transmission.

The invention is essentially particularly advantageously suitable for use in the near field or for wireless transmission over a short distances. However, the invention can generally also be suitable for far-field transmission or for transmission over distances longer than those specified above. The distance between the two transceiver arrangements can therefore essentially be arbitrary, for example even greater than 10 centimeters, for example 20 to 100 centimeters or more.

In one advantageous development of the invention, it can be provided that the two transceiver arrangements are rotatable relative to one another around a common axis of rotation.

The central points of the respective antenna arrangements or the common central points of the antennas of the respective antenna arrangement are therefore preferably arranged coaxially with one another and coincide with the common axis of rotation.

It can also be provided that the two transceiver arrangements are movable translationally relative to one another, for example along a duct, in particular in or opposite to the main radiation direction of the antennas.

In one advantageous development, it can be provided that the communication system has a contactless electrical connector in which the first transceiver arrangement is arranged, and a contactless electrical mating connector which is mechanically connectable to the connector and in which the second transceiver arrangement is arranged.

A contactless (particularly in relation to electrical contacts) connector or a wireless connector, i.e. a connector with a radio interface, can therefore be provided. The respective transceiver arrangement can be accommodated optionally in a hermetically sealed manner in the connector or mating connector.

The connector and the mating connector can preferably be designed as completely contactless, i.e. mechanically and electrically contactless, so that the connector and the mating connector do not touch one another. The connector and mating connector can therefore be designed as galvanically and/or mechanically separated from one another.

Unlike a conventional, contact-making connector, an electrically and optionally also mechanically contactless connector offers the advantage of less wear, since no plug-in procedures are required which result over time in mechanical abrasion of the conductor contacts. A further advantage of a contactless data plug or connector is that connectors and mating connectors can move relative to one another during operation (insofar as this is provided within the application). The particularly wear-affected use of sliding contacts, for example, or cables that move with them and are therefore exposed to mechanical stress can therefore be avoided.

The connector and the mating connector can be lockable with one another. The connector can have at least one first locking means and the mating connector can have a second locking means corresponding to the first locking means. The locking means can be designed, for example, as a locking catch, snap hook, spring clip, locking recess, female recess or other locking facility. A locking lever or other securing of the closed plug-in connection can also be provided. The locking is preferably designed such that the connector and the mating connector are still movable with at least one degree of freedom—optionally within defined limits—relative to one another even after the locking, for example translationally in the direction of insertion or along the main radiation direction of the antennas or rotationally around the axis of rotation already mentioned above.

The connector is preferably rotatable and/or movable at least in some areas relative to the mating connector (particularly in the connected state also).

The invention also relates to an actuator device, in particular an industrial robot system, having a first actuator element, a second actuator element and a communication system according to the descriptions above and below, wherein the first transceiver arrangement is arranged on the first actuator element and the second transceiver arrangement is arranged on the second actuator element in order to enable wireless signal transmission between the two actuator elements.

A contactless, bidirectional data transmission (full-duplex) in the same or at least in an overlapping frequency band (in-band full-duplex) can advantageously be provided for the actuator device, in particular for a multiaxial industrial robot system, wherein said communication can be enabled independently from the reciprocal rotation of the communication partners.

Finally, the invention further relates to a method for operating an antenna arrangement of a transceiver arrangement, in particular a high-frequency transceiver arrangement, having at least the following method steps: providing a transmit antenna group consisting of a first transmit antenna and a second transmit antenna which are connected in each case to a symmetric connection of a first balun; providing a receive antenna group consisting of a first receive antenna and a second receive antenna which are connected in each case to a symmetric connection of a second balun; operating the transmit antenna group via a transmit signal path of the transceiver arrangement which is connected to the first balun via the asymmetric connection of said first balun; operating the receive antenna group via a receive signal path of the transceiver arrangement which is independent from the transmit signal path and is connected to the second balun via the asymmetric connection of said second balun; wherein the first transmit antenna, the second transmit antenna, the first receive antenna and the second receive antenna are arranged in a spatial position relative to one another such that crosstalk between the transmit antenna group and the receive antenna group is at least reduced by means of the differential connection of their respective antennas.

The differential operation of the transmit antennas and the receive antennas offers the advantage that the adjustment on the asymmetric connection of the balun is considerably improved compared with the adjustment of the individual antennas. The improved adjustment in turn results in a more even frequency response of the transmission channel between the communication partners and therefore in fewer channel distortions. Fewer channel distortions ultimately result in reduced intersymbol interference, which in turn enables a higher data rate.

Features which have been described in connection with one of the subjects of the invention, i.e. comprising the antenna arrangement, the transceiver arrangement, the communication system, the actuator device or the method, are advantageously implementable for the other subjects of the invention also. Advantages which have been mentioned in connection with one of the subjects of the invention can similarly be understood to relate to the other subjects of the invention also.

In addition, it should be noted that terms such as "comprising". "having" or "with" do not exclude any other features or steps. Furthermore, terms such as "a/one" or "the" which refer to a singularity of steps or features do not exclude a plurality of features or steps—and vice versa.

However, in a puristic embodiment of the invention, it can also be provided that the features introduced in the invention with the terms "comprising", "having" or "with" are listed exhaustively. One or more listings of features according to the invention can accordingly be regarded as exhaustive, for example considered in each case for each claim. The invention can consist exclusively, for example, of the features specified in claim 1.

It should be mentioned that indications such as "first" or "second", etc. are used primarily on the grounds of the distinguishability of respective device features or method features and are not necessarily intended to indicate that features are mutually dependent or related to one another.

It should further be emphasized that the values and parameters described here also include deviations or fluctuations of ±10% or less, preferably ±5% or less, further preferably ±1% or less, and quite particularly preferably ±0.1% or less, of the respectively specified value or parameter, unless these deviations are excluded in the implementation of the invention in practice. The indication of ranges by means of initial and final values also comprises all those values and fractions which are encompassed by the respectively specified range, in particular the initial and final values and a respective mean value.

A separate invention will also be described below within the framework of the overall inventive concept. The applicant explicitly reserves the right to claim separately the subjects described below.

A separate invention relates to an attenuation arrangement for an antenna arrangement, wherein the attenuation arrangement is arrangeable around one or more antennas of the antenna arrangement, preferably on a base area (e.g. a side area of a printed circuit board), to which the antennas are connected. The attenuation arrangement has at least one first attenuation unit having an access opening within which said antennas are jointly arrangeable, wherein the central axis of the access opening runs along a main radiation direction of the antenna arrangement and/or through the common central point of said antennas.

A separate invention further relates to an antenna arrangement having one or more antennas, preferably the base area, and the aforementioned attenuation arrangement.

The features and advantages described in the present description relating to the antenna arrangement, attenuation arrangement and further subjects, are to be understood as advantageous embodiments and variants of the invention.

Exemplary embodiments of the invention are described in detail below with reference to the Figures.

The figures in each case show preferred exemplary embodiments in which individual features of the present invention are presented in combination with one another. Features of one exemplary embodiment are also implementable separately from the other features of the same exemplary embodiment and can accordingly be readily combined by a person skilled in the art with features of other exemplary embodiments to form further appropriate combinations and sub-combinations.

Functionally identical elements are denoted with the same reference signs in the figures.

SUMMARY

Our invention generally provides an antenna arrangement (1) for a transceiver arrangement, in particular for a high-frequency transceiver arrangement, preferably for use within a full-duplex communication channel, having a transmit antenna group having a first transmit antenna (2) and a second transmit antenna (3), and a receive antenna group having a first receive antenna (4) and a second receive antenna (5).

A principal aspect of the present invention is an antenna arrangement (1) for use within a full-duplex communication channel, having at least a first planar receiving antenna (4) and a transmitting antenna group with a first planar transmitting antenna (2) and a second planar transmitting antenna (3), the transmitting antennas (2, 3) and the first receiving antenna (4) are arranged with their respective main surfaces (6) parallel to a common base surface (7) around a common center of rotation (Z), and wherein the transmitting antennas (2, 3) are 180° to each other around the center of rotation (Z), are arranged rotated, and wherein the first receiving antenna (4) to both transmitting antennas (2, 3) has the same center-to-center distance (D).

A further aspect of the present invention is an antenna arrangement (1), characterized in that the first transmitting antenna (2) and the second transmitting antenna (3) have an identical structure.

A further aspect of the present invention is an antenna arrangement (1), marked by a second planar receiving antenna (5) with a preferably identical structure to the first receiving antenna (4), which forms a receiving antenna group together with the first receiving antenna (4) and has its main surfaces (6) parallel to the base surface (7) around the common center of rotation (Z) is arranged around, the receiving antennas (4, 5) being arranged rotated 180° to one another about the center of rotation (Z) and the second receiving antenna (5) having the same center-to-center distance to both transmitting antennas (2, 3), (D) as the first receiving antenna (4).

A further aspect of the present invention is an antenna arrangement (1), characterized in that at least the first receiving antenna (4) and the transmitting antennas (2, 3) are arranged relative to each other such that the center-to-center distance (D) between each The transmitting antenna (2, 3) and receiving antenna (4, 5) each correspond to half the wavelength (A) of the electromagnetic wave to be transmitted.

A further aspect of the present invention is an antenna arrangement (1), characterized in that the first receiving antenna (4) has an identical structure to the transmitting antennas (2, 3) and is preferably arranged rotated about the common center of rotation (Z) by 90° to the transmitting antennas (2, 3).

A further aspect of the present invention is an antenna arrangement (1), characterized in that at least the first receiving antenna (4) and the transmitting antennas (2, 3) are arranged in such a way that their respective main axis of symmetry (H) has an orientation angle (α) of 40° to 50° to a respective one between the center point (M) of the corresponding antenna (2, 3, 4, 5) and the center of rotation (Z), preferably an orientation angle (α) of 43° to 47°, particularly preferably an orientation angle (α) of essentially 45° or exactly 45°.

A further aspect of the present invention is an antenna arrangement (1), characterized in that the electromagnetic wave from a respective feed line (11) is coupled into the transmitting antennas (2, 3) by near-field coupling and is decoupled from the at least one receiving antenna (4, 5) by near-field coupling.

A further aspect of the present invention is an antenna arrangement (1), characterized in that the transmitting antennas (2, 3) and at least the first receiving antenna (4) are designed as patch antennas or as slot antennas.

A further aspect of the present invention is an antenna arrangement (1), characterized in that the respective main surfaces (6) of the transmitting antennas (2, 3) and at least the first receiving antenna (4) have an elliptical geometry or a rectangular geometry with exactly one pair of diagonally opposite beveled corners.

A further aspect of the present invention is an antenna arrangement (1), marked by a shielding arrangement (15) which is arranged around the transmitting antennas (2, 3) and the at least one receiving antenna (4, 5) and which essentially envelops the antennas (2, 3, 4, 5) in a sleeve-like manner, orthogonally to the Shielding jacket (16) running along the base surface, the shielding arrangement (15) preferably being formed from individual vias (14) which extend through the electrical assembly (8) forming the base surface (7).

A further aspect of the present invention is a transceiver arrangement (17), having an antenna arrangement (1) and a circuit arrangement (18) with a transmitting unit (19) and a receiving unit (20), wherein the transmitting unit (19) with the two transmitting antennas (2, 3) is connected in order to emit an electromagnetic wave by differential excitation of the two transmitting antennas (2, 3), and wherein the receiving unit (20) is connected at least to the first receiving antenna (4) in order to transmit an electromagnetic wave at least via the first receiving antenna (4) to receive.

A further aspect of the present invention is a transceiver arrangement (17), characterized in that the transmitting unit (19) has a first signal processing component (21) and a first balun (22) in order to excite the transmitting antennas (2, 3) with an electrical signal that is phase-shifted by 180° the first balun (22) preferably being used as a 180° hybrid coupler is trained.

A further aspect of the present invention is a communication system (25) comprising a first transceiver arrangement (17) and a second transceiver arrangement (17) for providing wireless signal transmission between the respective circuit arrangements (18) of the transceiver arrangements (17).

A further aspect of the present invention is a communication system (25), characterized in that the two transceiver arrangements (17) for wireless signal transmission are spaced a maximum of 5 meters apart, preferably spaced a maximum of 2 meters apart, more preferably spaced a maximum of 50 centimeters apart, most preferably spaced a maximum of 10 centimeters apart, and still more preferably spaced a maximum of 5 centimeters apart.

A further aspect of the present invention is a communication system (25), marked by a connector (26) in which the first transceiver arrangement (17) is arranged and a mating connector (27) which can be mechanically connected to the connector (26) and in which the second transceiver arrangement (17) is arranged.

A further aspect of the present invention is an antenna arrangement (1) for a transceiver arrangement (17), in particular for a high-frequency transceiver arrangement, having a transmit antenna group having a first transmit antenna (2), a second transmit antenna (3) and a first balun (22), and a receive antenna group having a first receive antenna (4), a second receive antenna (5) and a second balun (23), wherein the first transmit antenna (2) and the second transmit antenna (3) are connected in each case to a symmetric connection ($A_S$) of the first balun (22), and the first receive antenna (4) und the second receive antenna (5) are connected in each case to a symmetric connection ($A_S$) of the second balun (23), wherein an asymmetric connection (AA) of the first balun (22) is connectable to a transmit signal path (S) of the transceiver arrangement (17), and an asymmetric connection (AA) of the second balun (23) is connectable to a receive signal path (E) of the transceiver arrangement (17) independent from the transmit signal path (S), and wherein the first transmit antenna (2), the second transmit antenna (3), the first receive antenna (4) and the second receive antenna (5) have a spatial position relative to one another such that crosstalk between the transmit antenna group and the receive antenna group is at least reduced by the differential connection of their respective antennas (2, 3, 4, 5).

A further aspect of the present invention is an antenna arrangement (1), characterized in that the transmit antennas (2, 3) and the receive antennas (4, 5) are arranged around a common central point (Z), preferably on a common, imaginary circumference (K).

A further aspect of the present invention is an antenna arrangement (1), characterized in that the transmit antennas (2, 3) of the transmit antenna group, in relation to the common central point (Z), are arranged rotated through 180° relative to one another and/or the receive antennas (4,5) of the receive antenna group, in relation to the common central point (Z), are arranged rotated through 180 relative to one another.

A further aspect of the present invention is an antenna arrangement (1), characterized in that the first receive antenna (4), in relation to the common central point (Z), is arranged rotated through 90° relative to the transmit antennas (2, 3).

A further aspect of the present invention is an antenna arrangement (1), characterized in that each of the transmit antennas (2, 3) of the transmit antenna group in each case has the same center-to-center distance (D) to the two receive antennas (4, 5) of the receive antenna group.

A further aspect of the present invention is an antenna arrangement (1), characterized in that each of the receive antennas (4, 5) of the receive antenna group is distanced in each case from the transmit antennas (2, 3) of the transmit antenna group by less than half the free-space wavelength (1) of an electromagnetic wave to be transmitted.

A further aspect of the present invention is an antenna arrangement (1), characterized in that the first transmit antenna (2) and the second transmit antenna (3) are based on the same basic geometric shape, wherein the first transmit antenna (2) and the second transmit antenna (3) are preferably of identical design.

A further aspect of the present invention is an antenna arrangement (1), characterized in that the first transmit antenna (2), the second transmit antenna (3), the first receive antenna (4) and the second receive antenna (5) are co-polarized.

A further aspect of the present invention is an antenna arrangement (1), characterized in that the first transmit antenna (2), the second transmit antenna (3), the first receive antenna (4) and the second receive antenna (5) are designed as planar antennas, the main areas (6) of which are aligned parallel to a common base area (7), preferably parallel to a side area of an electrical printed circuit board (8) to which they are electrically and mechanically connected.

A further aspect of the present invention is an antenna arrangement (1), characterized in that the main areas (6) of the planar antennas (2, 3, 4, 5) have an elongated geometry, preferably a rectangular or elliptical geometry.

A further aspect of the present invention is an antenna arrangement (1), characterized in that each of the planar antennas (2, 3, 4, 5) has precisely one feed-in point (9) and is circularly polarized.

A further aspect of the present invention is an antenna arrangement (1), characterized in that each of the planar antennas (2, 3, 4, 5) is designed such that its main area (6) has a finite, non-zero number of axes of symmetry, preferably precisely two axes of symmetry or precisely three axes of symmetry.

A further aspect of the present invention is an antenna arrangement (1), characterized in that the planar antennas (2, 3, 4, 5) in each case form an orientation angle (a) between a main axis of symmetry (H), which Involves the longest of the axes of symmetry of the corresponding planar antenna (2, 3, 4, 5), and a straight line which runs between the geometric center of the corresponding planar antenna (2, 3, 4, 5) and the common central point (Z) of the antennas (2, 3, 4, 5), and wherein the planar antennas (2, 3, 4, 5) are aligned relative to one another in such a way that the orientation angles (a) of all planar antennas (2, 3, 4, 5) are at least essentially identical, preferably identical.

A further aspect of the present invention is an antenna arrangement (1), characterized by an attenuation arrangement (37) which is arranged around the first transmit antenna (2), the second transmit antenna (3), the first receive antenna (4) and the second receive antenna (5) and which has at least one first attenuation unit (38) having an access opening (39) within which said antennas (2, 3, 4, 5) are jointly arranged, wherein the central axis (MD) of the access opening (39) runs along a main radiation direction of the antenna arrangement (1) and/or through the common central point (Z) of said antennas (2, 3, 4, 5).

A further aspect of the present invention is an antenna arrangement (1), characterized in that the attenuation arrangement (37) has a second attenuation unit (41) having an access opening (39) within which said antennas (2, 3, 4, 5) are jointly arranged, wherein the first attenuation unit (38) and the second attenuation unit (41) are arranged concentrically, and wherein the first attenuation unit (38) and the second attenuation unit (41) differ from one another geometrically and/or in terms of their respective material composition.

A further aspect of the present invention is an antenna arrangement (1), characterized in that a transverse extension of an access opening (39) of the first attenuation unit (38) is at most 2.0 free-space wavelengths (1) of an electromagnetic wave to be transmitted with the antenna arrangement (1).

A further aspect of the present invention is an antenna arrangement (1), characterized in that the first attenuation unit (38) is arranged inside the access opening (39) of the second attenuation unit (41), preferably custom-fit.

A further aspect of the present invention is an antenna arrangement (1), characterized in that the second attenuation unit (41) has a greater extension along the central axis ($M_D$) than the first attenuation unit (38).

A further aspect of the present invention is an antenna arrangement (1), characterized in that the second attenuation unit (41) has a loss-based absorber and the first attenuation unit (38) has a resonance-based absorber.

A further aspect of the present invention is a transceiver arrangement (17), having an antenna arrangement (1), and also the transmit signal path (S) and the receive signal path (E), wherein the asymmetric connection ($A_A$) of the first balun (22) is connected to the transmit signal path (S) and the asymmetric connection ($A_A$) of the second balun (23) is connected to the receive signal path (E), and wherein the transmit signal path (S) has a transmit unit (19) and the receive signal path (20) has a receive unit (E).

A further aspect of the present invention is a transceiver arrangement (17), characterized in that the transmit unit (19) is designed to transmit a transmit signal with a first carrier frequency band, wherein the receive unit (20) is designed to receive a receive signal with a second carrier frequency band, wherein the first carrier frequency band and the second carrier frequency band are at least partially spectrally superimposed, preferably completely spectrally superimposed, on one another, and wherein the receive unit (20) is designed to receive the receive signal while the transmit unit transmits (19) the transmit signal.

A further aspect of the present invention is a communication system (25), having a first transceiver arrangement (17) and a second transceiver arrangement (17), for providing wireless signal transmission between the transceiver arrangements (17).

A further aspect of the present invention is an communication system (25), characterized in that the two transceiver arrangements (17) are arranged a maximum of 10 centimeters apart from one another for the wireless signal transmission, preferably a maximum of 5 centimeters apart from one another, particularly preferably a maximum of 2 centimeters apart from one another, quite particularly preferably a maximum of 1 centimeter apart from one another, for example a maximum of 0.5 centimeters apart from one another.

A further aspect of the present invention is an communication system (25), characterized in that the two transceiver arrangements (17) are rotatable relative to one another around a common axis of rotation, wherein the central points (Z) of the respective antenna arrangements (1) are arranged preferably coaxially to one another and coincide with the common axis of rotation.

A further aspect of the present invention is a communication system (25), characterized by a contactless electrical connector (26) in which the first transceiver arrangement (17) is arranged, and a contactless electrical mating connector (27) which is mechanically connectable to the electrical connector (26) and in which the second transceiver arrangement (17) is arranged, wherein the electrical connector (26) and the electrical mating connector (27) are preferably rotatable relative to one another in their interconnected state.

A still further aspect of the present invention is an actuator device (33), in particular an industrial robot system, having a first actuator element (35), a second actuator element (36) and a communication system (25), wherein the first transceiver arrangement (17) is arranged on the first actuator element (35) and the second transceiver arrangement (17) is arranged on the second actuator element (36) in order to enable wireless signal transmission between the two actuator elements (35, 36).

An even still further aspect of the present invention is a method for operating an antenna arrangement (1) of a transceiver arrangement (17), in particular a high-frequency transceiver arrangement having at least the following method steps of: providing a transmit antenna group consisting of a first transmit antenna (2) and a second transmit antenna (3) which are connected in each case to a symmetric connection ($A_S$) of a first balun (22); providing a receive antenna group consisting of a first receive antenna (4) and a second receive antenna (5) which are connected in each case to a symmetric connection ($A_S$) of a second balun (23); operating the transmit antenna group via a transmit signal path (S) of the transceiver arrangement (17) which is connected to the first balun (22) via the asymmetric connection ($A_S$) of said first balun (22); operating the receive antenna group via a receive signal path (E) of the transceiver arrangement (17) which is independent from the transmit signal path (S) and is connected to the second balun (23) via the asymmetric connection of said second balun (23); wherein the first transmit antenna (2), the second transmit antenna (3), the first receive antenna (4) and the second receive antenna (5) are arranged in a spatial position relative to one another such that crosstalk between the transmit antenna group and the receive antenna group is at least reduced by means of the differential connection of their respective antennas (2, 3, 4, 5)

These and other aspects of the present invention are more fully set forth and disclosed herein.

BRIEF DESCRIPTIONS OF THE FIGURES

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1:
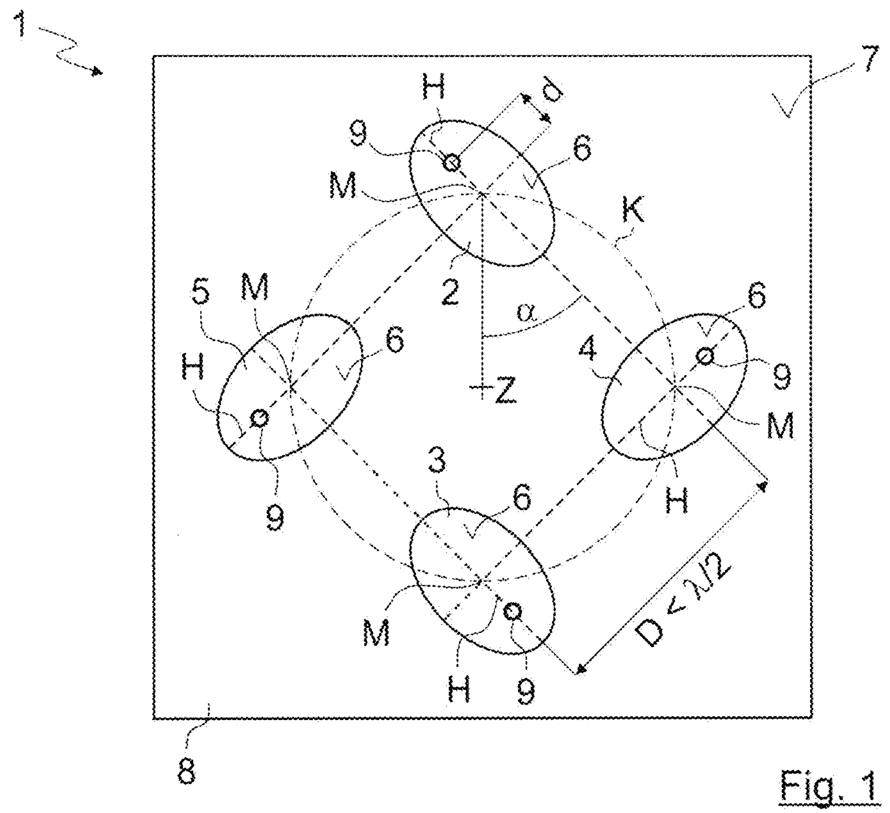
FIG. 1 shows a top view of an antenna arrangement having elliptical patch antennas.

FIG. 1 shows schematically an antenna arrangement 1 according to the invention for use within a full-duplex communication channel. The antenna arrangement 1 has a transmit antenna group formed from a first planar transmit antenna 2 and a second planar transmit antenna 3, and also a first planar receive antenna 4 and a second planar receive antenna 5 of identical design, which, together with the first receive antenna 4, form the receive antenna group.

All transmit antennas 2, 3 can be of identical design in the exemplary embodiments. The receive antennas 4, 5 can also preferably be of identical design to the transmit antennas 2, 3, i.e., in particular, the geometry, material and feed-in point of the antennas 2, 3, 4, 5 can in each case be identical.

The transmit antennas 2, 3 and the receive antennas 4, 5 are arranged with their respective main areas 6 parallel to a common base area 7 around a common central point or around a common center of rotation Z. The base area 7 is preferably formed on an electrical assembly which has the antennas 2, 3, 4, 5. The base area 7 can, in particular, be an outer metallization area, e.g. the top layer or the bottom layer, of an electrical printed circuit board 8. The center of rotation Z is preferably formed centrally between the two transmit antennas 2, 3 and, in the exemplary embodiment, is furthermore formed centrally between the two receive antennas 4, 5 also, but this is not to be understood as limiting. In the exemplary embodiment, all antennas 2, 3, 4, 5 are arranged with their central points M on a common, imaginary circumference K, the central point of which coincides with the center of rotation Z.

The transmit antennas 2, 3 are arranged rotated through 180° relative to one another around the center of rotation Z. The receive antennas 4, 5 are also rotated accordingly through 180° relative to one another, wherein the receive antennas 4, 5 are furthermore arranged rotated through 90° relative to the transmit antennas 2, 3 that are adjacent along the circumference K. The antennas 2, 3, 4, S are rotated around the center of rotation Z in each case in the same direction, in the exemplary embodiment rotating clockwise, and is clearly recognizable in FIG. 1, in particular on the basis of the position of the feed-in points 9 of the antennas 2, 3, 4, 5.

Figure 8:
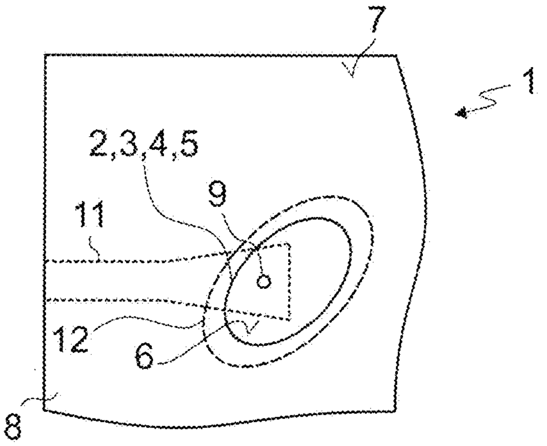
FIG. 8 shows a top view of the antenna arrangement from FIG. 7.

In other exemplary embodiments, the rotation of the antennas 2, 3, 4, 5 can also be recognizable on the basis of the similarly rotated feed lines of the antennas 2, 3, 4, 5, e.g. as in a capacitively coupled feed line, see also FIG. 8.

The first receive antenna 4 has the same center-to-center distance D to the two transmit antennas 2, 3. In the exemplary embodiment, the second receive antenna 5 also has the same center-to-center distance D to both transmit antennas 2, 3, wherein the center-to-center distance D of the second receive antenna 5 is identical to that of the first receive antenna 4. The overall result of this is the geometric arrangement shown in FIG. 1.

The center-to-center distance D between the receive antennas 4, 5 and the transmit antennas 2, 3 that are adjacent along the circumference K is preferably less than half the wavelength l of the electromagnetic wave to be transmitted, wherein the distance between the two transmit antennas 2, 3 and the distance between the two receive antennas 4, 5 corresponds precisely to half the wavelength l of the electromagnetic wave to be transmitted, or is similarly less than half the wavelength l.

The receive antennas 4, 5 and the transmit antennas 2, 3 are furthermore preferably arranged relative to one another in such a way that their respective main axes of symmetry H form an orientation angle $\alpha$ of essentially, or preferably precisely, 45°. The main axes of symmetry H of the antennas 2, 3, 4, 5 that are adjacent along the circumference K are aligned orthogonally to one another, as shown. However, it is not necessarily the actual orientation angle a that matters, but rather the fact that it is identical for all antennas.

Due to an identical orientation angle $\alpha$ on all antennas 2, 3, 4, 5 and/or due to the arrangement of all antennas 2, 3, 4, 5 with their central points M on the common, imaginary circumference K, crosstalk between the transmit antenna group and the receive antenna group can be at least reduced by means of the differential connection of their respective antennas 2, 3, 4, 5.

The antennas 2, 3, 4, 5 have a respective eccentrically offset feed-in point 9, wherein the respective eccentric offset d is identical for all antennas 2, 3, 4, 5. The feed-in point 9 is preferably located on the main axis of symmetry H, but this is not absolutely necessary. The feed-point 9 is normally matched to an input impedance of 50 Ohm; it should be noted here that a plurality of possible feed-in points 9 could accordingly also be present on the main area 6 of the respective antenna 2, 3, 4, 5, and for this reason the feed-in points 9 indicated in the exemplary embodiments are only to be understood as examples. It can essentially even be provided to use a plurality of feed-in points 9 simultaneously, but one single feed-in point per antenna 2, 3, 4, 5 is normally sufficient.

The antenna arrangement 1 shown enables extraordinarily effective isolation between the transmitter and the receiver if the transmit antennas 2, 3 of the transmit antenna group are excited with a signal that is phase-shifted through 180° and, in particular but not necessarily, if the received electromagnetic wave is likewise differentially evaluated by the receive antennas 4, 5 of the receive antenna group. Nevertheless, the antenna arrangement 1 can be designed with technically simple means, for example using simple printed circuit board technology.

The antennas 2, 3, 4, 5 are preferably designed as patch antennas, as in most of the exemplary embodiments. The patch antenna can be designed, in particular, as an electrically conductive area or metallized area on or in the printed circuit board 8. Alternatively, a complementary arrangement can also be provided, according to which the antennas 2, 3, 4, 5 are designed as slot antennas and have corresponding indents 10 in metallized areas, for example in metallized areas of the printed circuit board 8 (cf., for example, FIG. 3 and FIG. 11).

The respective main areas 6 of the antennas 2, 3, 4, 5 particularly preferably have an elliptical geometry, as shown in FIG. 1 and in some of the following figures. A particularly pure circular polarization of the electromagnetic wave can thereby be generated, in the antenna arrangement 1 shown in FIG. 1, for example, a clockwise circular polarization (alternatively, a counter-clockwise circular polarization can also be generated in the case of an arrangement of the antennas 2, 3, 4, 5 correspondingly rotated in each case through 90°). Alternatively, however, other geometries of the antennas 2, 3, 4, 5 can also be provided, some of which are shown by way of example in FIGS. 2 to 6.

Figure 2:
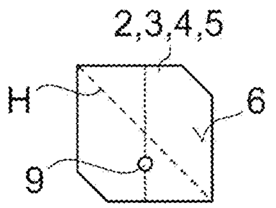
FIG. 2 shows an example of a further patch antenna for use in the antenna arrangement having a square geometry and two chamfered corners lying diagonally opposite one another.

As shown in FIG. 2, a square geometry, for example, with precisely one pair of punched out or recessed corners located diagonally opposite one another can be provided. In this case, the feed-in point 9 is preferably not located on the main axis of symmetry H, but instead on a straight line rotated through 45° relative to the main axis of symmetry H and running through the central point M of the antenna 2, 3, 4, 5.

Figure 3:
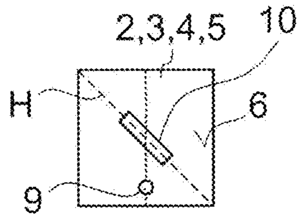
FIG. 3 shows an example of a further patch antenna for use in the antenna arrangement having a square geometry and a central, slot-shaped indent.

A further alternative antenna 2, 3, 4, 5 is shown in FIG. 3 which has a slot-shaped, diagonally arranged indent 10 centrally within the electrically conductive main area 6. The feed-in point 9 is in turn preferably arranged on the straight line aligned at 45° to the main axis of symmetry H and running through the central point M of the antenna 2, 3, 4, 5.

Figure 4:
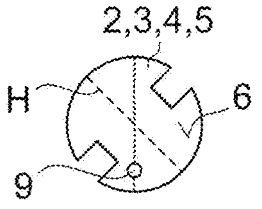
FIG. 4 shows an example of a further patch antenna for use in the antenna arrangement having a round geometry and two peripheral areas punched or recessed in the shape of a square.

A further alternative antenna geometry is shown in FIG. 4. The antenna 2, 3, 4, 5 is designed as circular and has precisely one pair of square, punched out or recessed sections located diagonally opposite each other. The feed-in point 9 is in turn arranged on the straight line tilted at 45° to the main axis of symmetry H and running through the central point M.

Figure 5:
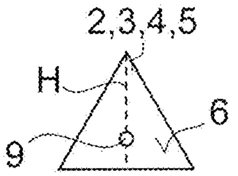
FIG. 5 shows an example of a further patch antenna for use in the antenna arrangement having a triangular geometry.

An antenna 2, 3, 4, 5 having a triangular geometry is shown as a further example in FIG. 5, wherein the feed-in point 9 is eccentrically offset on the main axis of symmetry H.

Figure 6:
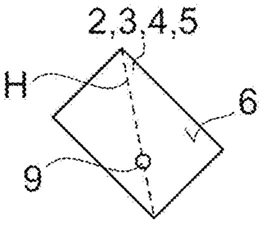
FIG. 6 shows an example of a further patch antenna for use in the antenna arrangement having a rectangular, elongated geometry.

FIG. 6 finally shows a longitudinally rectangular cross section of an antenna 2, 3, 4, 5, wherein the feed-in point 9 is in turn arranged on the main axis of symmetry H.

As already mentioned, still further feed-in points 9 can be provided, for example in FIG. 2 a further feed-in point 9 along the straight line shown mirrored upward over the central point of the antenna 2, 3, 4, 5, or in FIGS. 3, 4, 6 in each case up to four feed-in points 9.

Each of the aforementioned antennas 2, 3, 4, 5 can also designed complementarily as a respective slot antenna.

Figure 7:
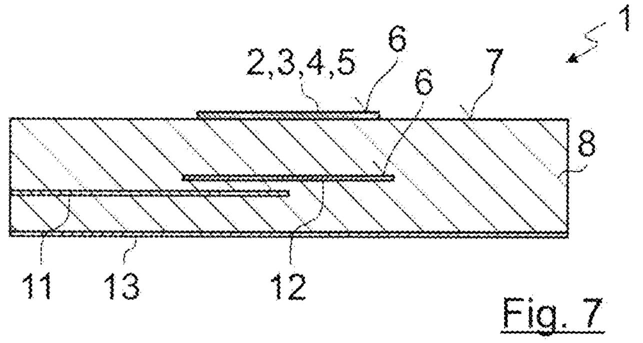
FIG. 7 shows a cross-sectional view of an antenna arrangement with near-field coupling or capacitive coupling.

Different variants are possible for injecting and extracting the electromagnetic wave into and from the respective antenna 2, 3, 4, 5. The preferred injection and extraction technique is shown in FIGS. 7 and 8. The electromagnetic wave is preferably injected primarily capacitively into the transmit antennas 2, 3 from a respective feed line 11, and is extracted primarily capacitively from the receive antennas 4, 5, as shown in the sectional view in FIG. 7. The feed-in point 9 is therefore only an imaginary point in FIG. 8. In the case of the capacitive injection, the rotation of the antennas 2, 3, 4, 5 is essentially easily recognizable by the angle of the incoming feed line 11. Ultimately, the angle of the incoming feed line 11 essentially influences the polarization of the antenna 2, 3, 4, 5. For the antenna 2, 3, 4, 5 shown in FIG. 8, for example, this results in a right-circular polarization due to the feed line arriving at 45° to the main axis H. If the antenna main area 6 were rotated through 90° around an imaginary axis running perpendicular to the main area 6 and through the central point of the main area, this would result in a left-circular polarization of the antenna 2, 3, 4, 5.

For advantageous impedance matching, the feed line 11 can undergo a continuous widening in the direction of the central point M of the respective antenna 2, 3, 4, 5 (cf. FIG. 8).

A stacked arrangement for the injection and extraction into and from the respective antenna 2, 3, 4, 5 by means of one or more intermediate antennas 12 can further increase the bandwidth of the arrangement. The main area 6 of the intermediate antenna 12 is preferably enlarged compared with the antenna 2, 3, 4, 5. Insofar as a plurality of intermediate antennas 12 are provided, their main area 6 enlarges with the distance from the corresponding antenna 2, 3, 4, 5.

In order to obtain a directional radiation pattern, a final ground plate 13 can be provided on the rear side of the corresponding antenna 2, 3, 4, 5, as is clearly recognizable in FIG. 7. This can be, for example, a metal coating on the printed circuit board 8 and/or a metal housing.

Figure 9:
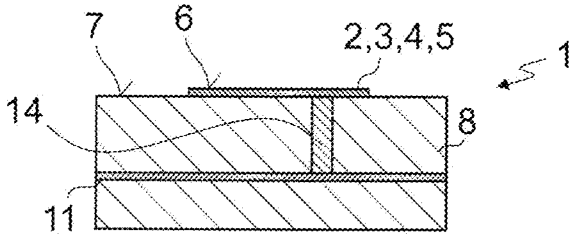
FIG. 9 shows a cross-sectional view of an antenna arrangement with direct coupling by means of through-connections.
Figure 10:
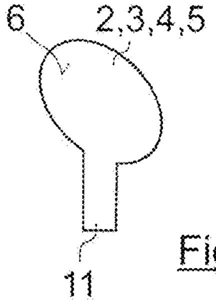
FIG. 10 shows a cross-sectional view of an antenna arrangement with direct coupling by means of a microstrip line.
Figure 11:
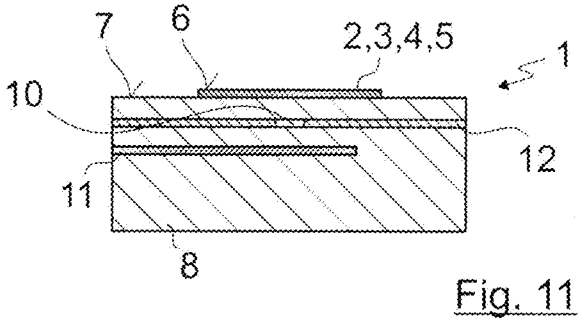
FIG. 11 shows a cross-sectional view of an antenna arrangement with coupling via an intermediate antenna designed as a slot antenna.

As an alternative to a near-field coupling, a direct excitation can also be provided, for example by means of a through-connection 14, shown in FIG. 9, of the printed circuit board 8 or through a feed by means of a microstrip line leading into the corresponding antenna 2, 3, 4, 5 (See FIG. 10). Furthermore, an injection by means of an intermediate antenna 12 designed as a slot antenna can also be provided, as shown in FIG. 11.

Figure 12:
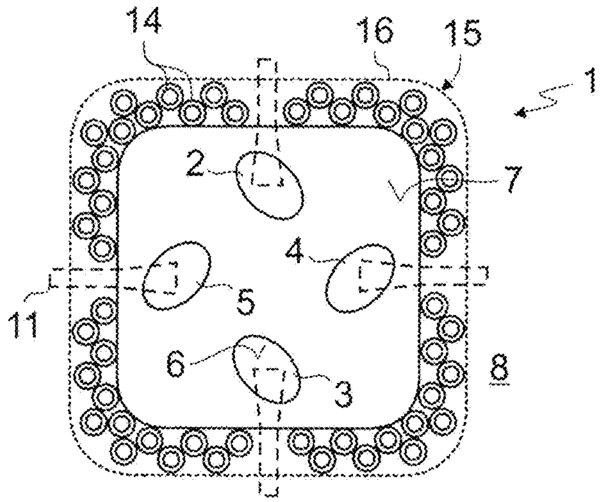
FIG. 12 shows a top view of an antenna arrangement having a circumferential shielding arrangement consisting of through-connections.

In order to increase the isolation characteristics and the shielding of the antenna arrangement 1 and, where appropriate, further optimize the radiation pattern, a shielding arrangement 15 can be provided, as shown by way of example in FIG. 12.

The shielding arrangement 15 can be arranged around the transmit antennas 2, 3 and the receive antennas 4, 5 and can envelop the antennas 2, 3, 4, 5 in an essentially tubular form. The shielding arrangement 15 can preferably form a shielding casing 16 running orthogonal to the base area 7 (indicated by a dotted line in FIG. 12). The shielding arrangement 15 can be formed, for example, by a metal plate, or alternatively, as shown in FIG. 12, from individual through-connections 14 which extend through the printed circuit board 8 and are arranged preferably regularly and, quite particularly preferably, in at least two rows.

One advantage of the shielding arrangement 15 in combination with the antenna arrangement 1 lies in the shielding of the conductor structures from the radiation field of the antennas 2, 3, 4, 5 arranged around the antenna arrangement 1. Asymmetrically arranged conductor structures in particular can influence the radiation fields of the transmit antennas 2, 3 and receive antennas 4, 5 differently and can therefore result in uneven crosstalk between the transmit antennas 2, 3 and the receive antennas 4, 5. The consequence of this may be that the crosstalk from the two transmit antennas 2, 3 to the receive antennas can no longer be cancelled out or can be only partially cancelled out, which can reduce the antenna isolation.

Figure 13:
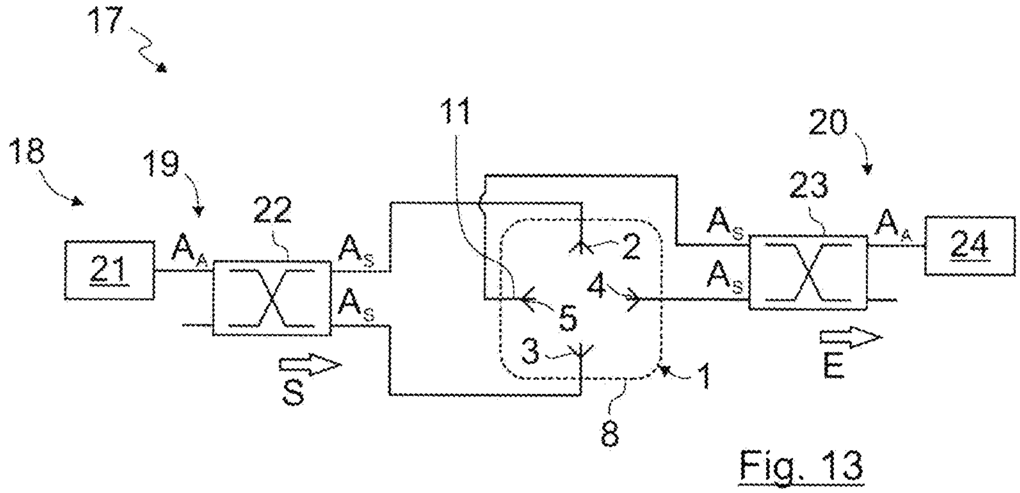
FIG. 13 shows a transceiver arrangement.

FIG. 13 shows, by way of example, a transceiver arrangement 17 according to the invention. The transceiver arrangement 17 has an antenna arrangement 1 according to the descriptions herein, and a circuit arrangement 18 having a transmit unit (TX) 19 and a receive unit (RX) 20.

The transmit unit 19 is connected to the two transmit antennas 2, 3 in order to radiate an electromagnetic wave through differential excitation of the two transmit antennas 2, 3. For this purpose, the transmit unit 19 has a first signal processing component 21 in the transmit signal path S, and the transmit antenna group has a first balun or first balancing unit 22 in order to excite the transmit antennas 2, 3 with an electrical signal phase-shifted through 180°. The first balancing unit 22 is preferably designed as a 180° hybrid coupler. The first transmit antenna 2 and the second transmit antenna 3 are connected in each case to a symmetric connection $A_S$ of the first balun 22. The transmit unit 19 or the signal processing component 21 of the transmit unit 19 is connected to an asymmetric connection $A_A$ of the first balun 22.

For the differential reception with the two receive antennas 4, 5, the receive unit 20 is connected to the two receive antennas 4, 5 via a second balun of the receive antenna group or via a second balancing unit 23, preferably likewise a 180° hybrid coupler, in order to receive the electromagnetic wave and forward it to a second signal processing component 24 in the receive signal path E. The first receive antenna 3 and the second receive antenna 4 are connected in each case to a symmetric connection $A_S$ of the second balun 23. The receive unit 20 or the signal processing component 24 of the receive unit 20 is connected to an asymmetric connection $A_A$ of the second balun 23.

Independence between the transmit signal path S and the receive signal path E within the same transceiver arrangement 17 means, for example, that said transceiver arrangement 17 can serve to route different, i.e. uncorrelated, signals. The transmit signal path S can route a transmit signal which can be emitted via the transmit antennas 2, 3 and can be transmitted wirelessly to a second transceiver arrangement 17. The receive signal path E can route a receive signal which is transmitted from the second transceiver arrangement 17 and is received via the receive antennas 4, 5.

In addition, and also as shown in FIG. 13, the transmit signal path S and the receive signal path E can be galvanically isolated from one another.

A wireless communication system 25 can be formed by means of two transceiver arrangements 17 of this type. A communication system 25 of this type can comprise a first and a second communication partner, wherein the first communication partner can comprise a first transceiver arrangement 17 and the second communication partner can comprise a second transceiver arrangement 17 of the type disclosed here. The communication system 25 according to the invention is particularly advantageously suitable for short-distance wireless signal transmission, for example of a maximum of 5 meters, and normally even shorter distances of, for example, a maximum of 10 centimeters. By means of the antenna arrangement 1 proposed according to the invention, wireless communication can be possible, even in the near field, largely independently, preferably completely independently, from the alignment of the two transceiver arrangement 17 relative to one another, at least if the central points Z of the antenna arrangement 1 are located on a common axis of rotation which is aligned perpendicular to the printed circuit boards 8. The signal transmission can then, in particular, be independent from a rotation of the antenna arrangements 1 relative to one another.

One advantageous application is, inter alia, robotics, as a substitute, for example, for sliding contacts in the field of articulated joints, or applications in which a communication connection is established under particularly adverse environmental conditions and is therefore hermetically shielded.

Figure 14:
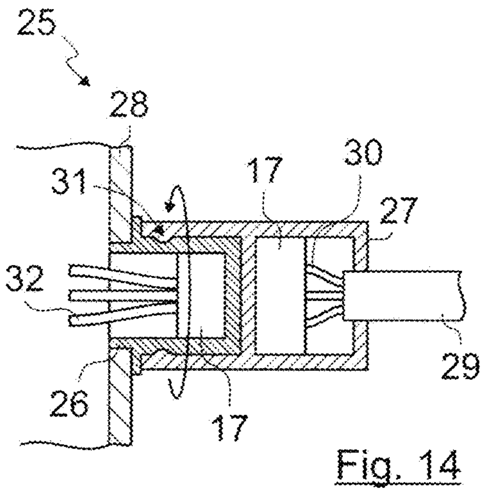
FIG. 14 shows a communication system having an electrical connector and an electrical mating connector.

FIG. 14 shows, by way of example, a communication system 25 which has an electrical connector 26 in which a first transceiver arrangement 17 is arranged and which has an electrical mating connector 27 mechanically connectable to the connector 26 in which system a second transceiver arrangement 17 is arranged.

The connector 26 can be connected, for example, to a device housing 28. The mating connector 27 can, for example, be a cable connector into which an electrical cable 29 with single electrical lines 30 leads. The connector 26 and the mating connector 27 can have locking means in order to interlock in the connected state. FIG. 14 shows, by way of example, an interlocking plug-in connection consisting of a connector 26 and a mating connector 27 which enable a rotation of the partners relative to one another. A contactless or wireless plug-in connection independent from the direction of rotation can thus advantageously be provided in order to transmit electrical signals between the cable 29 or the electrical lines 30 of the cable 29 and electrical conductors 32 inside the device housing 28. The connector 26 and the mating connector 27 can preferably be designed as completely contactless, i.e. electrically and mechanically contactless.

Further applications are essentially conceivable, for example applications in energy technology or in vehicle technology.

Figure 15:
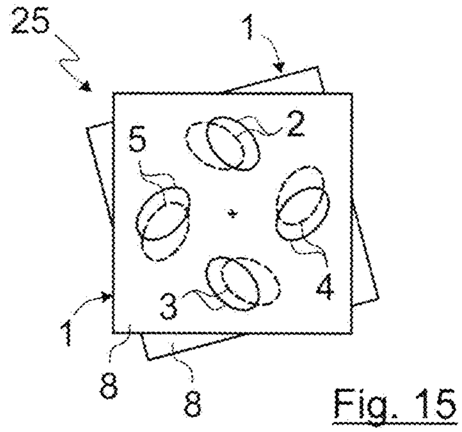
FIG. 15 shows a further communication system with communication partners arranged rotated relative to one another.

A further communication system 25 is shown, by way of example, in a simplified representation in FIG. 15 in order to illustrate once more the particular advantage of the invention in the transmission of communication partners which are arranged rotated relative to one another. In FIG. 15, the antenna arrangements 1 are arranged coaxially to one another, but are arranged rotated around the center of rotation, wherein an advantageous signal transmission can nevertheless take place by means of the proposed antenna arrangements 1. A tilting of the antenna arrangements 1 relative to one another can also be compensated, as well as an eccentric offset of the respective centers of rotation.

Figure 16:
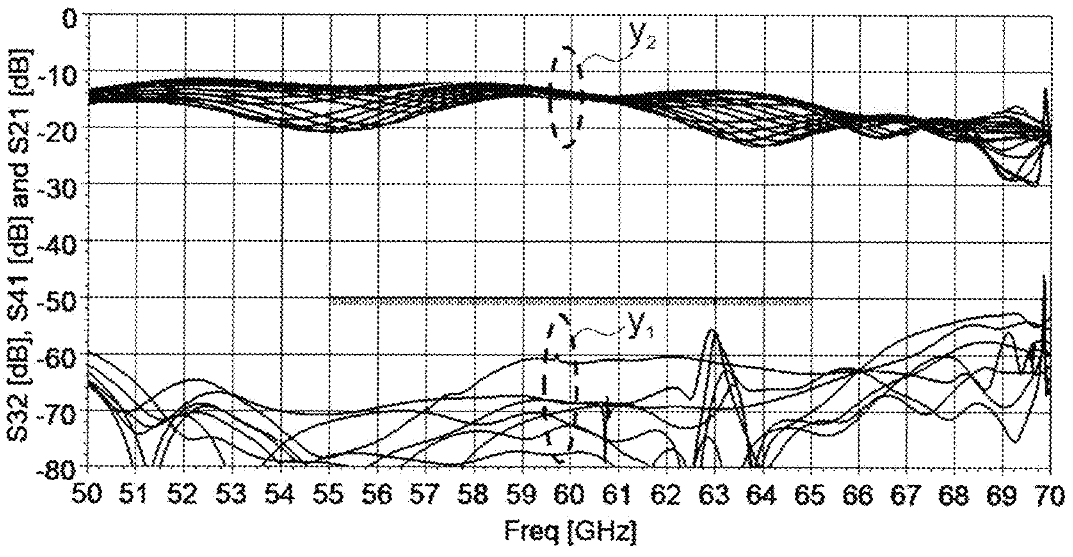
FIG. 16 shows simulation results of the transmission characteristic and isolation characteristic of a communication system.

FIG. 16 shows simulation results of a communication system 25 according to the invention in order to illustrate the advantageous transmission characteristics and isolation characteristics of an antenna arrangement 1 according to the invention. An antenna arrangement 1 as shown in FIG. 1 and in FIGS. 7 and 8 has been simulated, having a transmission bandwidth of 10 GHz and a distance between the two transceiver arrangements 17 or antenna arrangements 1 of 12 millimeters. The individual curves of the two arrays of curves represent the simulation results with different orientations/angles of rotation of the two communication partners relative to one another. On one hand, the high isolation characteristics between the transmitter and receiver of the same transceiver are recognizable (isolation within the proposed frequency band >50 dB, cf. lower array of curves $y_1$) and, on the other hand, the high independence of the transmission characteristics from the alignment or orientation of the two communication partners relative to one another is evident (cf. upper array of curves $y_2$).

Figure 17:
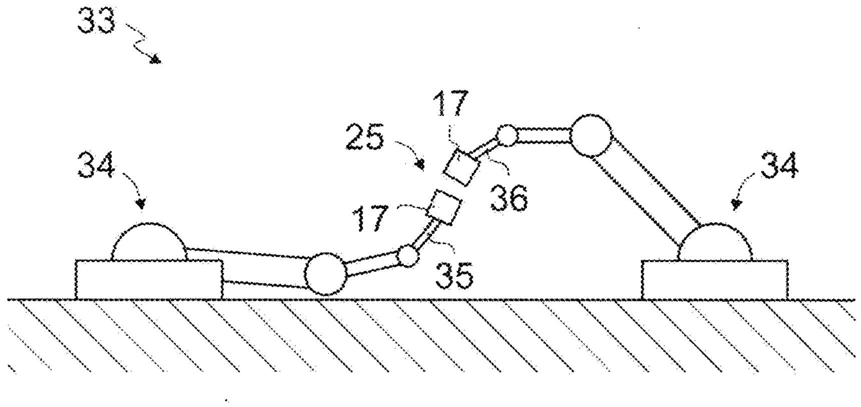
FIG. 17 shows an actuator device according to one exemplary embodiment of the invention.

As already mentioned, the use of the proposed antenna arrangement 1 in assemblies that are movable relative to one another during actuation can similarly be highly advantageous in order to enable wireless signal transmission over short distances and with high data rates, with high electromagnetic compatibility, FIG. 17 shows an actuator device 33 for illustrative purposes. An industrial robot system consisting of two separate, multi-axial industrial robots 34 is shown by way of example, but this is Intended to serve only as an example. The actuator device 33 has a first actuator element 35, a second actuator element 36 and a communication system 25, wherein the first transceiver arrangement 17 can be arranged on the first actuator element 35 and the second transceiver arrangement 17 can be arranged on the second actuator element 36 in order to enable wireless signal transmission between the two actuator elements 35, 36. In the exemplary embodiment shown in FIG. 17, the actuator elements 35, 36 are in each case the end-effectors of the industrial robots 34, but they can essentially be any movable or immovable elements of a general actuator device 33. Both actuator elements 35, 36 can, for example, also be part of the same device, i.e., for example, the same industrial robot 34, for example in order to enable signal transmission along the individual axes of the industrial robot 34, for example to bridge articulated joints wirelessly and without the use of sliding contacts, etc.

As already mentioned herein, reflections of the electromagnetic wave can occur during the signal transmission between the communication partners, which can result in unwanted multipath propagation. Particularly if the communication partners are located in close proximity opposite one another, such as, for example, in the exemplary embodiments shown in FIGS. 14, 15 and 17, the reflections can occur on the printed circuit boards 8 to which the antennas 2, 3, 4, 5 are connected. As indicated by dotted-line arrows in FIG. 18, as well as a transmission via the line-of-sight component, the signal can also be reflected back and forth between the communication partners and can therefore be transmitted via one or more reflection components, which can ultimately result in interference between the wanted line-of-sight component and the unwanted reflection component(s). In order to minimize this multipath propagation as much as possible, but without using complex signal processing components, such as digital signal processing, an advantageous attenuation arrangement 37 for an antenna arrangement is proposed on the basis of FIGS. 18 to 20 and the explanations below (particularly, but not exclusively, for the above antenna arrangement 1).

Figure 18:
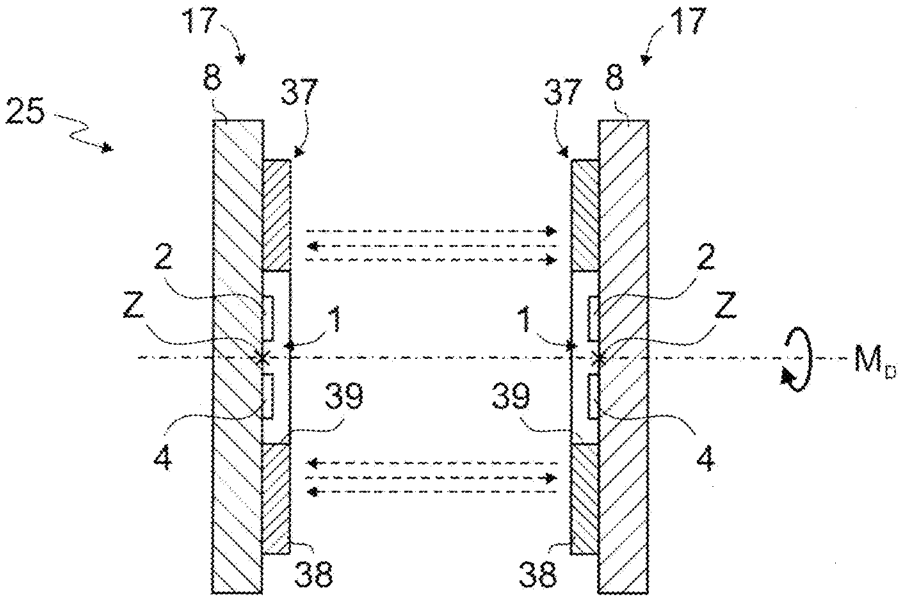
FIG. 18 shows a further communication system with two communication partners, having a respective attenuation arrangement according to a first variant.
Figure 19:
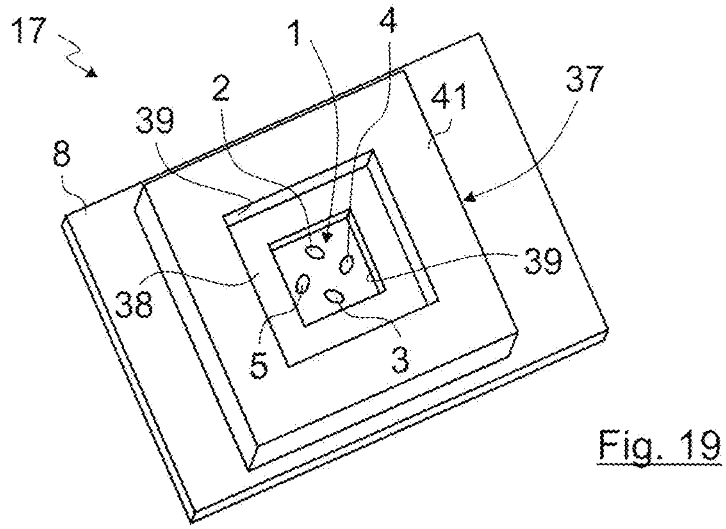
FIG. 19 shows a perspective view of a further transceiver arrangement having an attenuation arrangement according to a second variant.

FIG. 18 shows a communication system 25 consisting of a first and a second transceiver arrangement 17. Each of the transceiver arrangements 17 has a printed circuit board 8 on which a respective antenna arrangement 1 is arranged. An attenuation arrangement 37 which has a first attenuation unit 38, in the exemplary embodiments an absorber sheet, having an access opening 39 within which the antennas 2, 3, 4, 5 of the antenna arrangement 1 are arranged together is arranged around the antenna arrangement 1. The central axis $M_D$ of the access opening 39 runs along the main radiation direction or antenna main lobe 40 of the antenna arrangement 1 (cf. FIG. 20) and further runs through the common central point or the center of rotation Z of the antennas 2, 3, 4, 5.

It can be provided that the transverse extension of the access opening 39 of the first attenuation unit 38 is less than 2.0 free-space wavelengths of the electromagnetic wave to be transmitted, so that the access opening 39 is as narrow as possible, but such that the antenna main lobes 40 of the antennas 2, 3, 4, 5 are not covered in a top view. The access opening 39 can essentially have any geometry, for example circular (preferred) or square, as shown by way of example in the exemplary embodiments in FIGS. 18 to 20.

The multipath propagation can advantageously be eliminated or at least significantly reduced by the proposed attenuation arrangement 37. The reflections shown by dotted lines in FIG. 18 can no longer occur, or can still occur in substantially reduced form only.

The attenuation arrangement 37 can be extended with further attenuation units for further optimization. The principle is explained with reference to FIGS. 19 and 20. It can be provided, for example, that the attenuation arrangement 37 has a second attenuation unit 41, again having an access opening 39 within which the antenna arrangement 1 is arranged. The first attenuation unit 38 and the second attenuation unit 41 are arranged concentrically and preferably (but not necessarily) differ from one another geometrically and/or in terms of their respective material composition. The second attenuation unit 41, for example, preferably has a loss-based absorber and the first attenuation unit 38 preferably has a resonance-based absorber. Suitable material compositions are described herein.

In particular, it can be provided that the first attenuation unit 38 is arranged inside the access opening 39 of the second attenuation unit 41, as illustrated. The outer or second attenuation unit 41 can preferably be formed as thicker or higher than the inner or first attenuation unit 38. As a result, the antenna main lobes 40 of the transmit antenna group and of the receive antenna group can be given sufficient space for expansion in the main radiation direction without the antenna main lobes 40 intersecting one of the attenuation units 38, 41 in the top view.

Figure 20:
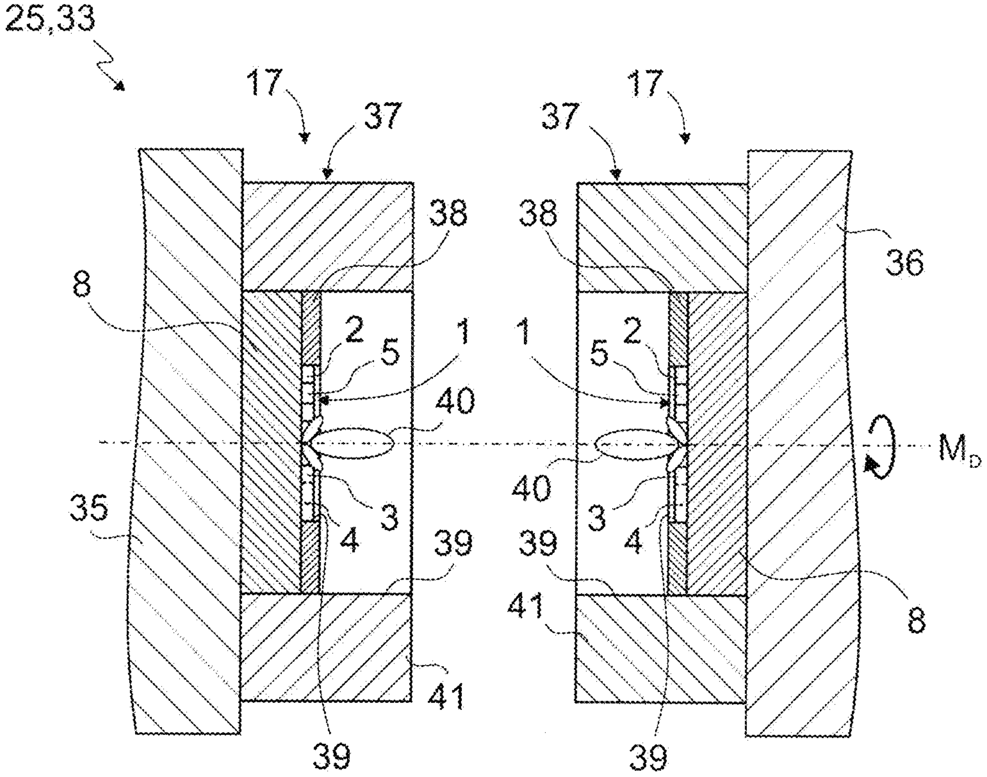
FIG. 20 shows two of the transceiver arrangements shown in FIG. 19 in a further communication system.

FIG. 20 will now be referred to in order to explain quite generally how the transceiver arrangements 17 of the communication system 25 can be aligned to minimize transmission losses. The antenna main lobes 40 of the transmit antennas 2, 3 of the first communication partner and the receive antennas 4, 5 of the second communication partner (and vice versa) are preferably to be aligned with one another along the central axis $M_D$ of the attenuation arrangement, or in such a way that the respective common central points or centers of rotation Z of the antenna arrangements 1 of both communication partners run through a common axis of rotation or central axis. The antenna main lobe 40 of a patch antenna points, for example, perpendicularly away from the patch antenna, whereas an antenna gain minimum is present in the opposite direction, i.e. into the printed circuit board 8. It is therefore advantageous to align the printed circuit boards 8 of the two communication partners parallel or at least essentially parallel to one another, so that the patch antennas are facing one another, as shown. The transceiver arrangements 17 of the exemplary embodiment shown in FIG. 20 can be arranged, for example, on a respective actuator element 35, 36 of an actuated device 33 which can perform a rotational movement relative to one another.

Within the antenna main lobe 40, which has a certain width (for example approximately −20° to +20° of the angle of elevation), a parallel translational offset can be possible (referred to above as an "axial offset" of the communication partners, i.e. as an offset between the respective central axes of the communication partners running through the central points Z of the antenna arrangements 1). The communication partners can also move perpendicularly toward one another or away from one another (referred to above as a "translational offset"). A tilting of the communication partners is also possible (referred to above as a "radial offset").

In particular, however, a complete rotation ("rotational offset") of the communication partners relative to one another around the imaginary axis standing perpendicular to the printed circuit boards 8 can be enabled (in FIG. 20 the central axis $M_D$). This can be exploited, for example, in robotics, if a robot joint or an actuator element 35, 36 is intended to rotate through 360° and data are intended to be transmitted from one side of the robot joint to the other side in a contactless and therefore wear-free manner. To enable the rotation, the transmit antennas 2, 3 of the first communication partner and also the receive antennas 4, 5 of the second communication partner are preferably circularly polarized and co-polarized. However, to enable the rotation, it would also be conceivable (while accepting polarization losses) that either only the transmit antennas 2, 3 or only the receive antennas 4 5 are circularly polarized, whereas the respective other antennas are only linearly polarized.

In the exemplary embodiment described with reference to FIG. 20, the second attenuation unit 41 is to be considered as optional.

The distance between the first and the second transceiver arrangement 17 can be defined as the shortest distance between the antenna arrangement 1 of the first transceiver arrangement 17 and of the second transceiver arrangement 17 parallel to the central axis $M_D$. The distance between the first and the second transceiver arrangement 17 can be defined, for example, on the basis of the distance between the common central point Z of the antenna arrangement 1 of the first transceiver arrangement 17 (on the left in FIG. 20) and the common central point Z of the antenna arrangement 1 of the second transceiver arrangement 17 (on the right in FIG. 20).

The communication system 25 shown in FIG. 20 can be a contactless data plug or electrical connector in which the distance between the first and the second transceiver arrangement 17 is less than 10 cm or is even less than 5 cm. This contactless connector can use a carrier frequency of more than 50 GHz, e.g. approximately 60 GHz, for the data transmission, which can result in small antenna dimensions and can therefore facilitate good integrability of the contactless connector. A carrier frequency of more than 50 GHz can further enable high data rates. The contactless connector can use in-band full-duplex communication and therefore also enable high data rates due to the transmit antennas 2, 3 and receive antennas 4, 5 that are well isolated from one another within the same transceiver arrangement. The transmit units 19 of the transceiver arrangements 17 can optionally have a freewheeling, voltage-controlled oscillator to generate a carrier frequency for the signal transmission. Additionally or alternatively, the receive units 20 of the transceiver arrangements 17 can be designed to carry out an incoherent demodulation. The receive units 20 can have an envelope detector for this purpose. The power consumption of the contactless connector can be reduced due to the freewheeling, voltage-controlled oscillator and/or due to the envelope detector, which can in turn simplify the integration of said connector into e.g. industrial systems. The reduced power consumption can also substantially alleviate requirements for the heat dissipation of the contactless connector, thus removing the need for heat sinks. For further or alternative power saving, the contactless connector described here can optionally dispense with digital signal processing, in particular digital channel estimation, digital signal pre-emphasis or digital signal equalization. Good radio channel characteristics can be established due to the attenuation arrangements 37, e.g. wherein the signal transmission takes place primarily only via the line-of-sight component between the first and the second transceiver arrangement 17 and multipath components are substantially attenuated. This can eliminate the need for the digital signal processing described above and can therefore enable power saving and simplified heat dissipation. The DC power consumption of the first and the second transceiver arrangement 17 can, for example, in each case be less than 200 mW.

OPERATION

Having described the structure of our antenna arrangement, transceiver arrangement, communication system, actuator device and method for operating an antenna arrangement its structure and operation is briefly described.

A principal object of the present invention is an antenna arrangement (1) for a transceiver arrangement (17), in particular for a high-frequency transceiver arrangement, comprising: a transmit antenna group having, a first transmit antenna (2), and a second transmit antenna (3), and a first balun (22); and a receive antenna group having, a first receive antenna (4), and a second receive antenna (5); and a second balun (23); and wherein the first transmit antenna (2) and the second transmit antenna (3) are both connected to a symmetric connection ($A_S$) of the first balun (22); and the first receive antenna (4) and the second receive antenna (5) are both connected to a symmetric connection ($A_S$) of the second balun (23); and wherein an asymmetric connection ($A_A$) of the first balun (22) is connectable to a transmit signal path (S) of the transceiver arrangement (17); and an asymmetric connection ($A_A$) of the second balun (23) is connectable to a receive signal path (E) of the transceiver arrangement (17) independent from the transmit signal path (S); and wherein the first transmit antenna (2), and the second transmit antenna (3), and the first receive antenna (4) and the second receive antenna (5) all have a spatial position relative to one another such that crosstalk between the transmit antenna group and the receive antenna group is reduced by a differential connection of the respective antennas (2, 3, 4, 5); and wherein each of the first and second receive antennas (4, 5) has the same center-to-center distance to both the first and second transmit antennas (2, 3).

A further object of the present invention is an antenna arrangement (1) and wherein the first and second transmit antennas (2, 3), and the first and second receive antennas (4, 5) are arranged around a common central point (Z), on a common, circumference (K).

A further object of the present invention is an antenna arrangement (1) and wherein the first and second transmit antennas (2, 3) of the transmit antenna group, in relation to the common central point (Z), are arranged rotated through 180° relative to one another; and the first and second receive antennas (4, 5) of the receive antenna group, in relation to the common central point (Z), are arranged rotated through 180° relative to one another.

A further object of the present invention is an antenna arrangement (1) and wherein the first receive antenna (4), in relation to the common central point (Z), is arranged rotated through 90° relative to the first and second transmit antennas (2, 3).

A further object of the present invention is an antenna arrangement (1) and wherein each of the first and second receive antennas (4, 5) of the receive antenna group is distanced, from each of the first and second transmit antennas (2, 3) of the transmit antenna group by less than half a free-space wavelength (l) of an electromagnetic wave to be transmitted.

A further object of the present invention is an antenna arrangement (1) and wherein the first transmit antenna (2) and the second transmit antenna (3) have a same basic geometric shape; and wherein the first transmit antenna (2) and the second transmit antenna (3) are of identical design.

A further object of the present invention is an antenna arrangement (1) and wherein the first transmit antenna (2), and the second transmit antenna (3), and the first receive antenna (4) and the second receive antenna (5) are co-polarized.

A further object of the present invention is an antenna arrangement (1) and wherein the first transmit antenna (2), and the second transmit antenna (3), and the first receive antenna (4) and the second receive antenna (5) are planar antennas; and the first planar transmit antenna (2), and the second planar transmit antenna (3), and the first planar receive antenna (4) and the second planar receive antenna (5) all define main areas (6); and the main areas (6) of each of the respective antennas (2, 3, 4, 5) are aligned parallel to a common base area (7), parallel to a side area of an electrical printed circuit board (8) to which each of the respective antennas (2, 3, 4, 5) are electrically and mechanically connected.

A further object of the present invention is an antenna arrangement (1) and wherein the main areas (6) of each of the respective planar antennas (2, 3, 4, 5) have an elongated geometry.

A further object of the present invention is an antenna arrangement (1) and wherein each of the respective planar antennas (2, 3, 4, 5) each has a main area (6) that has a finite, non-zero number of axes of symmetry.

A further object of the present invention is an antenna arrangement (1) and wherein the planar antennas (2, 3, 4, 5) each form an orientation angle (α) between a main axis of symmetry (H), which involves a longest of the axes of symmetry of the respective planar antenna (2, 3, 4, 5), and a straight line which runs between a geometric center of the respective planar antenna (2, 3, 4, 5) and the common central point (Z) of the planar antennas (2, 3, 4, 5), and wherein the planar antennas (2, 3, 4, 5) are aligned relative to one another so that the orientation angles (α) of all the planar antennas (2, 3, 4, 5) are essentially identical.

A further object of the present invention is an antenna arrangement (1) and further comprising: an attenuation arrangement (37) which is arranged around the first transmit antenna (2), and the second transmit antenna (3), and the first receive antenna (4) and the second receive antenna (5); and wherein the attenuation arrangement (37) has a first attenuation unit (38) that defines an access opening (39) within which the first and second transmit antennas (2, 3), and the first and second receive antennas (4, 5) are jointly arranged; and wherein a central axis ($M_D$) of the access opening (39) runs along a main radiation direction of the antenna arrangement (1) and/or through the common central point (Z) of the first and second transmit antennas (2, 3) and the first and second receive antennas (4, 5).

A further object of the present invention is an antenna arrangement (1) and further comprising: a second attenuation unit (41) that defines an access opening (39) within which the first and second transmit antennas (2, 3) and the first and second receive antennas (4, 5) are jointly arranged; and wherein the first attenuation unit (38) and the second attenuation unit (41) are arranged concentrically; and wherein the first attenuation unit (38) and the second attenuation unit (41) differ from one another geometrically and/or material composition.

A further object of the present invention is a transceiver arrangement (17) comprising: an antenna arrangement (1) having a transmit antenna group that has a first transmit antenna (2), and a second transmit antenna (3), and a first balun (22), and a receive antenna group having, a first receive antenna (4), and a second receive antenna (5), and a second balun (23), and wherein the first transmit antenna (2) and the second transmit antenna (3) are both connected to a symmetric connection ($A_S$) of the first balun (22), and the first receive antenna (4) and the second receive antenna (5) are both connected to a symmetric connection ($A_S$) of the second balun (23), and wherein the first transmit antenna (2), and the second transmit antenna (3), and the first receive antenna (4) and the second receive antenna (5) all have a spatial position relative to one another such that crosstalk between the transmit antenna group and the receive antenna group is reduced by a differential connection of the respective antennas (2, 3, 4, 5); and wherein an asymmetric connection ($A_A$) of the first balun (22) is connected to a transmit signal path (S); and an asymmetric connection ($A_A$) of the second balun (23) is connected to a receive signal path (E); and wherein the transmit signal path (S) has a transmit unit (19); and the receive signal path (20) has a receive unit (E); and wherein each of the receive antennas (4, 5) has the same center-to-center distance to both transmit antennas (2, 3).

A further object of the present invention is a transceiver arrangement (17) and wherein the transmit unit (19) transmits a transmit signal with a first carrier frequency band; and wherein the receive unit (20) receives a receive signal with a second carrier frequency band; and wherein the first carrier frequency band and the second carrier frequency band are at least partially spectrally superimposed, on one another; and wherein the receive unit (20) receives the receive signal while the transmit unit transmits (19) the transmit signal.

A further object of the present invention is a communication system (25) for providing wireless signal transmission comprising: a first transceiver arrangement (17) and a second transceiver arrangement (17), each of the first transceiver arrangement (17) and the second transceiver arrangement (17) having an antenna arrangement (1) having a transmit antenna group that has a first transmit antenna (2), and a second transmit antenna (3), and a first balun (22), and a receive antenna group having, a first receive antenna (4), and a second receive antenna (5), and a second balun (23), and wherein the first transmit antenna (2) and the second transmit antenna (3) are both connected to a symmetric connection ($A_S$) of the first balun (22), and the first receive antenna (4) and the second receive antenna (5) are both connected to a symmetric connection ($A_S$) of the second balun (23), and wherein the first transmit antenna (2), and the second transmit antenna (3), and the first receive antenna (4) and the second receive antenna (5) all have a spatial position relative to one another such that crosstalk between the transmit antenna group and the receive antenna group is reduced by a differential connection of the respective antennas (2, 3, 4, 5); and wherein an asymmetric connection ($A_S$) of the first balun (22) is connected to a transmit signal path (S); and an asymmetric connection ($A_A$) of the second balun (23) is connected to a receive signal path (E); and wherein the transmit signal path (S) has a transmit unit (19); and the receive signal path (20) has a receive unit (E); and wherein each of the first and second receive antennas (4, 5) has the same center-to-center distance to both transmit antennas (2, 3).

A further object of the present invention is a communication system (25) and wherein the first transceiver arrangement (17) and the second transceiver arrangement (17) are rotatable relative to one another around a common axis of rotation; and wherein central points (Z) of the respective antenna arrangements (1) are arranged coaxially to one another and coincide with a common axis of rotation.

A further object of the present invention is a communication system (25) and further comprising: a contactless electrical connector (26) in which the first transceiver arrangement (17) is arranged; and a contactless electrical mating connector (27) which is mechanically connectable to the contactless electrical connector (26) and in which the second transceiver arrangement (17) is arranged; and wherein the contactless electrical connector (26) and the contactless electrical mating connector (27) are rotatable relative to one another in their interconnected state.

A further object of the present invention is an actuator device (33), in particular an industrial robot system, comprising: a first actuator element (35); and a second actuator element (36); and a communication system (25) for providing wireless signal transmission, the communication system (25) having a first transceiver arrangement (17) and a second transceiver arrangement (17), each of the first transceiver arrangement (17) and the second transceiver arrangement (17) having an antenna arrangement (1) having a transmit antenna group that has a first transmit antenna (2), and a second transmit antenna (3), and a first balun (22), and a receive antenna group having, a first receive antenna (4), and a second receive antenna (5), and a second balun (23), and wherein the first transmit antenna (2) and the second transmit antenna (3) are both connected to a symmetric connection ($A_S$) of the first balun (22), and the first receive antenna (4) and the second receive antenna (5) are both connected to a symmetric connection ($A_S$) of the second balun (23), and wherein the first transmit antenna (2), and the second transmit antenna (3), and the first receive antenna (4) and the second receive antenna (5) all have a spatial position relative to one another such that crosstalk between the transmit antenna group and the receive antenna group is reduced by a differential connection of the respective antennas (2, 3, 4, 5); and wherein an asymmetric connection ($A_A$) of the first balun (22) is connected to a transmit signal path (S); and an asymmetric connection ($A_A$) of the second balun (23) is connected to a receive signal path (E); and wherein the transmit signal path (S) has a transmit unit (19); and the receive signal path (20) has a receive unit (E); and wherein each of the first and second receive antennas (4, 5) has the same center-to-center distance to both transmit antennas (2, 3); and wherein the first transceiver arrangement (17) is arranged on the first actuator element (35), and the second transceiver arrangement (17) is arranged on the second actuator element (36) in order to enable wireless signal transmission between the first and the second actuator elements (35, 36).

A further object of the present invention is a method for operating an antenna arrangement (1) of a transceiver arrangement (17), in particular a high-frequency transceiver arrangement comprising the steps: providing a transmit antenna group consisting of a first transmit antenna (2), and a second transmit antenna (3), and the first transmit antenna (2) and the second transmit antenna (3) are each connected to a symmetric connection ($A_S$) of a first balun (22); providing a receive antenna group consisting of a first receive antenna (4), and a second receive antenna (5), and the first receive antenna (4) and the second receive antenna (5) are each connected to a symmetric connection ($A_S$) of a second balun (23); operating the transmit antenna group via a transmit signal path (S) of the transceiver arrangement (17) which is connected to the first balun (22) via an asymmetric connection ($A_S$) of said first balun (22); operating the receive antenna group via a receive signal path (E) of the transceiver arrangement (17) which is independent from the transmit signal path (S) and is connected to the second balun (23) via an asymmetric connection of said second balun (23); and wherein the first transmit antenna (2), the second transmit antenna (3), the first receive antenna (4) and the second receive antenna (5) are arranged in a spatial position relative to one another such that crosstalk between the transmit antenna group and the receive antenna group is reduced by a differential connection of their respective antennas (2, 3, 4, 5); and wherein each of the first and second receive antennas (4, 5) has the same center-to-center distance to both transmit antennas (2, 3).

A still further object of the present invention is an antenna arrangement (1) and wherein each of the respective planar antennas (2, 3, 4, 5) has a main area (6) that precisely two axes of symmetry.

An even still further object of the present invention is an antenna arrangement (1) and wherein each of the respective planar antennas (2, 3, 4, 5) has a main area (6) that precisely three axes of symmetry.

In compliance with the statute, the present invention has been described in language more or less specific as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An antenna arrangement for a transceiver arrangement, in particular for a high-frequency transceiver arrangement, comprising: a transmit antenna group having, a first transmit antenna, and a second transmit antenna, and a first balun; and a receive antenna group having, a first receive antenna, and a second receive antenna; and a second balun; and wherein the first transmit antenna and the second transmit antenna are both connected to a symmetric connection of the first balun; and the first receive antenna and the second receive antenna are both connected to a symmetric connection of the second balun; and wherein an asymmetric connection of the first balun is connectable to a transmit signal path of the transceiver arrangement; and an asymmetric connection of the second balun is connectable to a receive signal path of the transceiver arrangement independent from the transmit signal path and wherein the first transmit antenna, and the second transmit antenna, and the first receive antenna and the second receive antenna all have a spatial position relative to one another such that crosstalk between the transmit antenna group and the receive antenna group is reduced by a differential connection of the respective antennas; and wherein each of the first and second receive antennas has the same center-to-center distance to both the first and second transmit antennas.

2. The antenna arrangement as claimed in claim 1 and wherein the first and second transmit antennas and the first and second receive antennas are arranged around a common central point, on a common, circumference.

3. The antenna arrangement as claimed in claim 2 and wherein the first and second transmit antennas of the transmit antenna group, in relation to the common central paint, are arranged rotated through 180° relative to one another; and the first and second receive antennas of the receive antenna group, in relation to the common central point, are arranged rotated through 180° relative to one another.

4. The antenna arrangement as claimed in claim 1 and wherein each of the first and second receive antennas of the receive antenna group is distanced, from each of the first and second transmit antennas of the transmit antenna group by less than half a free-space wavelength of an electromagnetic wave to be transmitted.

5. The antenna arrangement as claimed in claim 1 and wherein the first transmit antenna, and the second transmit antenna, and the first receive antenna and the second receive antenna are planar antennas; and the first planar transmit antenna, and the second planar transmit antenna, and the first planar receive antenna and the second planar receive antenna all define main areas; and the main areas of each of the respective antennas are aligned parallel to a common base area, parallel to a side area of an electrical printed circuit board to which each of the respective antennas are electrically and mechanically connected.

6. The antenna arrangement as claimed in claim 5 and wherein the main areas of each of the respective planar antennas have an elongated geometry.

7. The antenna arrangement as claimed in claim 5 and wherein each of the respective planar antennas each has a main area that has a finite, non-zero number of axes of symmetry.

8. The antenna arrangement as claimed in claim 7 and wherein the first and second transmit antennas and the first and second receive antennas are arranged around a common central point, on a common circumference, and the planar antennas each form an orientation angle between a main axis of symmetry, which involves a longest of the axes of symmetry of the respective planar antenna, and a straight line which runs between a geometric center of the respective planar antenna and the common central point of the planar antennas, and wherein the planar antennas are aligned relative to one another so that the orientation angles of all the planar antennas are essentially identical.

9. The antenna arrangement as claimed in claim 1 and further comprising: the first and second transmit antennas and the first and second receive antennas are arranged around a common central point, on a common circumference, and an attenuation arrangement which is arranged around the first transmit antenna, and the second transmit antenna, and the first receive antenna and the second receive antenna and wherein the attenuation arrangement has a first attenuation unit that defines an access opening within which the first and second transmit antennas, and the first and second receive antennas are jointly arranged; and wherein a central axis of the access opening runs along a main radiation direction of the antenna arrangement and/or through the common central point of the first and second transmit antennas and the first and second receive antennas.

10. The antenna arrangement as claimed in claim 9 and further comprising: a second attenuation unit that defines an access opening within which the first and second transmit antennas and the first and second receive antennas are jointly arranged; and wherein the first attenuation unit and the second attenuation unit are arranged concentrically; and wherein the first attenuation unit and the second attenuation unit differ from one another geometrically and/or material composition.

11. A transceiver arrangement comprising: an antenna arrangement having a transmit antenna group that has a first transmit antenna, and a second transmit antenna, and a first balun, and a receive antenna group having, a first receive antenna, and a second receive antenna, and a second balun, and wherein the first transmit antenna and the second transmit antenna are both connected to a symmetric connection of the first balun, the first receive antenna and the second receive antenna are both connected to a symmetric connection of the second balun, and wherein the first transmit antenna, and the second transmit antenna, and the first receive antenna and the second receive antenna all have a spatial position relative to one another such that crosstalk between the transmit antenna group and the receive antenna group is reduced by a differential connection of the respective antennas and wherein an asymmetric connection of the first balun is connected to a transmit signal path; and an asymmetric connection of the second balun is connected to a receive signal path independent from the transmit signal path and wherein the transmit signal path has a transmit unit; and the receive signal path has a receive unit and wherein each of the receive antennas has the same center-to-center distance ta both transmit antennas.

12. A communication system for providing wireless signal transmission, comprising: a first transceiver arrangement and a second transceiver arrangement, each of the first transceiver arrangement and the second transceiver arrangement having an antenna arrangement having a transmit antenna group that has a first transmit antenna, and a second transmit antenna, and a first balun, and a receive antenna group having, a first receive antenna, and a second receive antenna, and a second balun, and wherein the first transmit antenna and the second transmit antenna are both connected to a symmetric connection of the first balun, and the first receive antenna and the second receive antenna are both connected to a symmetric connection of the second balun, and wherein the first transmit antenna, and the second transmit antenna, and the first receive antenna and the second receive antenna all have a spatial position relative to one another such that crosstalk between the transmit antenna group and the receive antenna group is reduced by a differential connection of the respective antennas; and wherein an asymmetric connection of the first balun is connected to a transmit signal path and an asymmetric connection of the second balun is connected to a receive signal path independent from the transmit signal path and wherein the transmit signal path has a transmit unit and the receive signal path has a receive unit; and wherein each of the first and second receive antennas has the same center-to-center distance to both transmit antennas.

13. The communication system as claimed in claim 12 and wherein the first transceiver arrangement and the second transceiver arrangement are rotatable relative to one another around a common axis of rotation; and wherein central points of the respective antenna arrangements are arranged coaxially to one another and coincide with a common axis of rotation.

14. An actuator device, in particular an industrial robot system, comprising: a first actuator element; and a second actuator element; and a communication system for providing wireless signal transmission, the communication system having a first transceiver arrangement and a second transceiver arrangement, each of the first transceiver arrangement and the second transceiver arrangement having an antenna arrangement having a transmit antenna group that has a first transmit antenna, and a second transmit antenna, and a first balun, and a receive antenna group having, a first receive antenna, and a second receive antenna, and a second balun, and wherein the first transmit antenna and the second transmit antenna are both connected to a symmetric connection of the first balun, and the first receive antenna and the second receive antenna are both connected to a symmetric connection of the second balun, and wherein the first transmit antenna, and the second transmit antenna, and the first receive antenna and the second receive antenna all have a spatial position relative to one another such that crosstalk between the transmit antenna group and the receive antenna group is reduced by a differential connection of the respective antennas and wherein an asymmetric connection of the first balun is connected to a transmit signal path; and an asymmetric connection of the second balun is connected to a receive signal path independent from the transmit signal path and wherein the transmit signal path has a transmit unit; and the receive signal path has a receive unit and wherein each of the first and second receive antennas has the same center-to-center distance to both transmit antennas; and wherein, the first transceiver arrangement is arranged on the first actuator element, and the second transceiver arrangement is arranged on the second actuator element in order to enable wireless signal transmission between the first and the second actuator elements.

15. A method for operating an antenna arrangement of a transceiver arrangement, in particular a high-frequency transceiver arrangement comprising the steps: providing a transmit antenna group consisting of a first transmit antenna, and a second transmit antenna, and the first transmit antenna and the second transmit antenna are each connected to a symmetric connection of a first balun; providing a receive antenna group consisting of a first receive antenna, and a second receive antenna, and the first receive antenna and the second receive antenna are each connected to a symmetric connection of a second balun; operating the transmit antenna group via a transmit signal path of the transceiver arrangement which is connected to the first balun via an asymmetric connection of said first balun; operating the receive antenna group via a receive signal path of the transceiver arrangement which Is independent from the transmit signal path and is connected to the second balun via an asymmetric connection of said second balun; and wherein the first transmit antenna, the second transmit antenna, the first receive antenna and the second receive antenna are arranged in a spatial position relative to one another such that crosstalk between the transmit antenna group and the receive antenna group is reduced by a differential connection of their respective antennas; and wherein each of the first and second receive antennas has the same center-to-center distance to both transmit antennas.

16. The antenna arrangement as claimed in claim 5 and wherein each of the respective planar antennas has a main area that has precisely two axes of symmetry.

17. The antenna arrangement as claimed in claim 5 and wherein each of the respective planar antennas has a main area that has precisely three axes of symmetry.

* * * * *